United States Patent
Ueda et al.

[19]

[11] Patent Number: 5,903,805
[45] Date of Patent: May 11, 1999

[54] BELT SLIPPAGE CORRECTING DEVICE WHICH CONTROLS MOVEMENT OF THE BELT IN A DIRECTION PERPENDICULAR TO THE BELT TRANSPORTING DIRECTION

[75] Inventors: Masahide Ueda; Eiichi Sano, both of Takatsuki, Japan

[73] Assignee: Minolta Co., Ltd., Osaka, Japan

[21] Appl. No.: 08/652,123

[22] Filed: May 23, 1996

[30] Foreign Application Priority Data

May 26, 1995 [JP] Japan .................................... 7-128484

[51] Int. Cl.$^6$ ........................... G03G 15/00; G03G 21/00
[52] U.S. Cl. ............................................................ 399/165
[58] Field of Search .................................... 399/162, 163, 399/164, 165

[56] References Cited

U.S. PATENT DOCUMENTS

| | | | |
|---|---|---|---|
| 4,174,171 | 11/1979 | Hamaker et al. | 399/165 |
| 4,206,994 | 6/1980 | Silverberg et al. | 399/165 |
| 4,344,693 | 8/1982 | Hamaker | 399/165 |
| 4,961,089 | 10/1990 | Jamzadeh | 399/165 |
| 5,019,864 | 5/1991 | Blanding | 399/165 |
| 5,200,782 | 4/1993 | Castelli et al. | 399/165 |
| 5,225,877 | 7/1993 | Wong | 399/165 X |
| 5,415,961 | 5/1995 | Yu et al. | 399/164 X |
| 5,455,656 | 10/1995 | Covert et al. | 399/163 X |
| 5,467,171 | 11/1995 | Castelli et al. | 399/162 |
| 5,606,396 | 2/1997 | Yu et al. | 399/162 |

*Primary Examiner*—Fred L. Braun
*Attorney, Agent, or Firm*—Burns, Doane, Swecker & Mathis, L.L.P.

[57] ABSTRACT

A belt slippage correcting device and method for correcting slippage of a belt which is transported in a predetermined direction. The belt slippage correcting device has a slippage detecting device for detecting slippage of the belt in a direction perpendicular to the belt transporting direction and a moving device for moving the belt in the direction perpendicular to the belt transporting direction and control device for controlling the moving device based on the detected slippage of the belt by the belt slippage detecting device The slippage of the belt is corrected while the moving velocity of the belt in the direction perpendicular to the belt transporting direction is maintained within a predetermined scope of velocity. The device and method may be used in an image forming apparatus, such as an electrophotographic image forming apparatus.

8 Claims, 33 Drawing Sheets

HOST COMPUTER

EQUALLY DIVIDE LINE OF
SUSPENSION ANGLE

BELT SLIPPAGE CORRECTING DEVICE WHICH CONTROLS MOVEMENT OF THE BELT IN A DIRECTION PERPENDICULAR TO THE BELT TRANSPORTING DIRECTION

BACKGROUND OF THE INVENTION

1. Field of the Invention

The present invention pertains to a belt slippage correcting device used to correct the slippage of a belt conveyed such that it circulates along a prescribed route. Belts that are conveyed such that they circulate along a prescribed route include, for example, in the area of electrophotographic image forming devices, a belt-shaped photosensitive member, an intermediate transfer belt and a fusing belt used in image formation.

2. Description of the Related Art

Conventionally, various types of devices have been proposed as belt slippage correcting devices to correct the slippage of a belt conveyed such that it circulates along a prescribed route. For example, in the area of electrophotographic image forming devices, many belt slippage correcting devices that correct the position of the belt by changing the tilt angle of one of the suspension rollers supporting the belt have been proposed, as belt slippage correcting devices to correct the slippage of a belt-shaped photosensitive member, intermediate transfer belt, fusion belt, etc. However, these belt slippage correcting devices have low correction accuracy and in particular, when used on belts used for image formation, such as a belt-shaped photosensitive member and intermediate transfer belt, there are cases where color discrepancies and image discrepancies occur due to said slippage.

SUMMARY OF THE INVENTION

The object of the present invention is to provide a slippage correcting device capable of performing highly accurate correction of the slippage of a belt.

Another object of the present invention is to provide a belt slippage correcting device that corrects the slippage of a belt used for image formation in an electrophotographic image forming device with high accuracy such that color discrepancies and image discrepancies may be reduced.

Yet another object of the present invention is to provide a slippage correcting device that can perform correction of the slippage of a belt with high accuracy such that a prescribed point on the belt in the direction perpendicular to the direction of conveyance may approach a preset target position at a prescribed belt speed.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
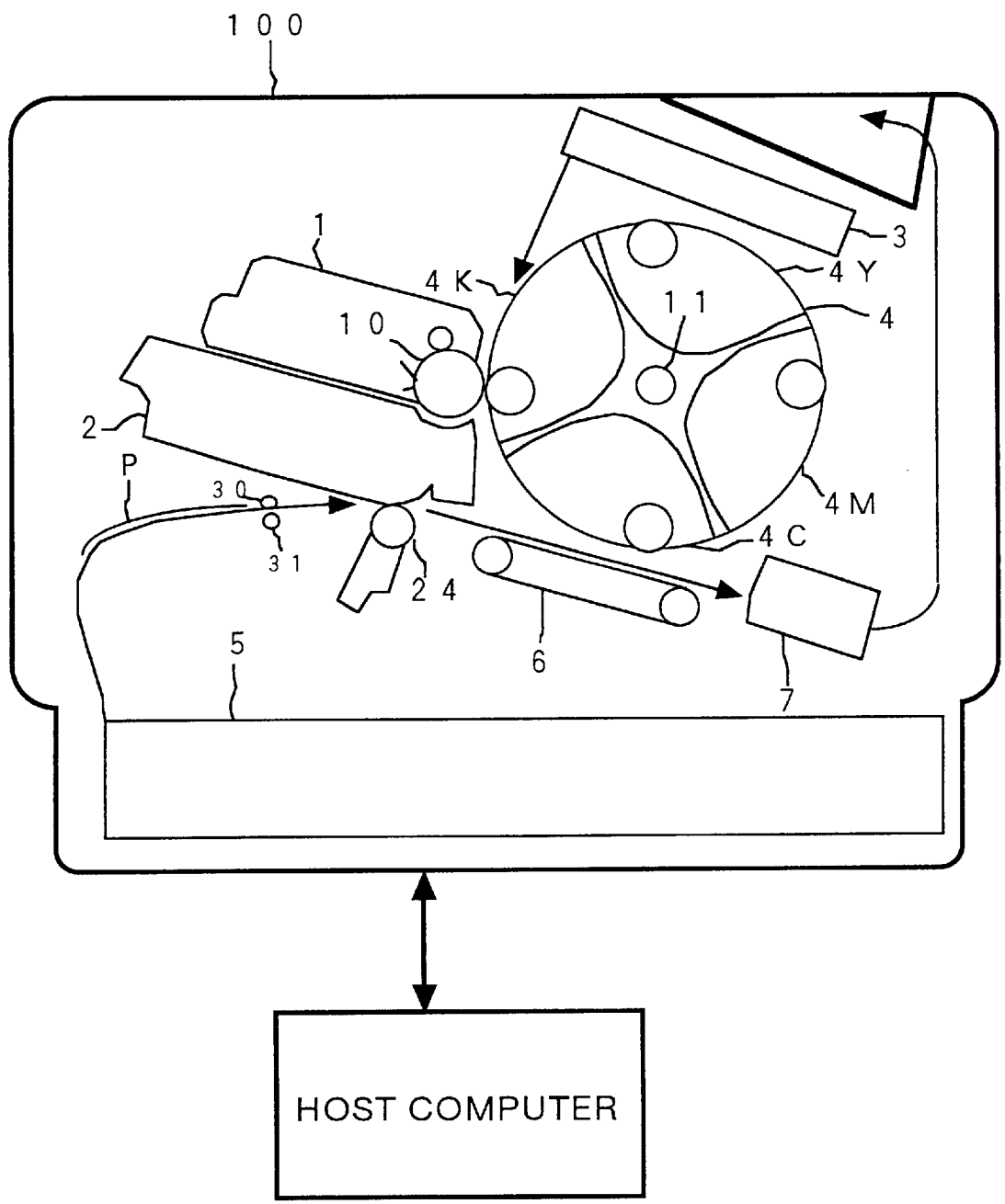
FIG. 1 is a cross-sectional view of an electrophotographic image forming device.

FIG. 1 is a cross-sectional view of electrophotographic image forming device 100.

Electrophotographic image forming device 100 is an electrophotographic printer that forms an image after receiving data from a host computer, and primarily comprises photosensitive unit 1, intermediate transfer unit 2, optical system unit 3, developing unit 4, paper feed cassette 5, copy paper transfer unit 6 and fusing device 70.

Photosensitive unit 1 houses photosensitive member 10 and image forming elements such as a charging device and a cleaner located around photosensitive member 10. Photosensitive member 10 is uniformly charged by the charging device after it is cleaned by the cleaner.

Print head 3 houses a laser diode, scanning optical system, etc. It controls the laser diode based on data from the host computer, and forms an electrostatic latent image on photosensitive member 10 that is uniformly charged.

Developing unit 4 is located such that it can rotate around developing unit shaft 11. Developing unit 4 houses developing devices 4Y, 4M, 4C and 4K. The selected developing device faces photosensitive member 10 by means of the rotation of developing unit 4. The developing device that comes to face photosensitive member 10 develops the electrostatic latent image formed on photosensitive member 10 forming a toner image.

Paper feed cassette 5 feeds printing paper P housed inside it at prescribed times and transfers the paper to the area between timing rollers 30 and 31.

Figure 2:
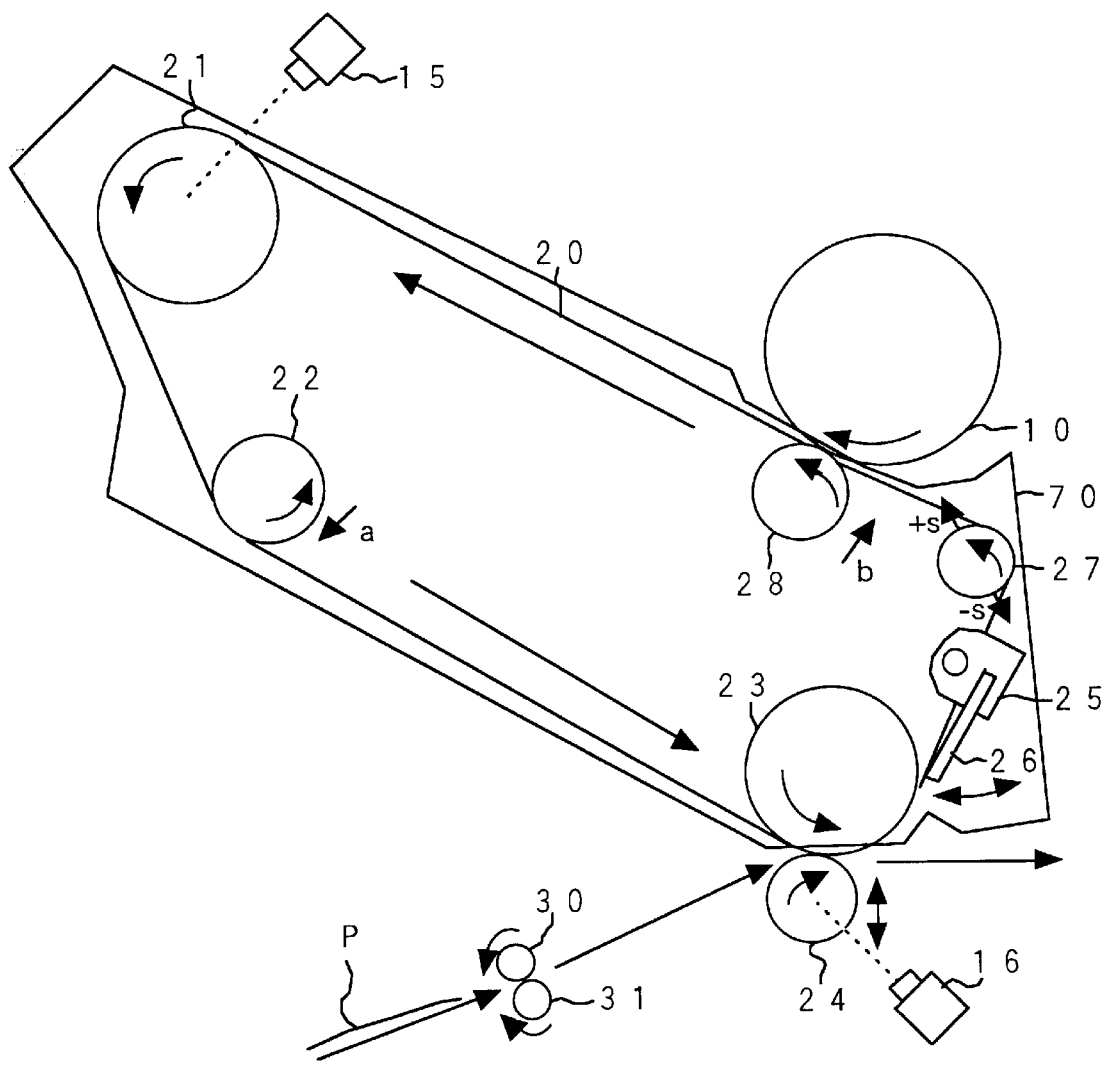
FIG. 2 is a cross-sectional view showing the construction of an intermediate transfer unit.

The construction of intermediate transfer unit 2 will now be explained in detail. FIG. 2 is a cross-sectional view showing the construction of intermediate transfer unit 2.

Intermediate transfer unit 2 primarily comprises intermediate transfer belt 20 drive roller 21, energizing roller 22 second transfer facing roller 23, intermediate transfer belt cleaner 25, first transfer pre-roller 27 and first transfer roller 28. Intermediate transfer belt 20 is a continuous loop belt having a length of 640 mm and a width of 350 mm, and is made of polycarbonate. The size of intermediate transfer belt 20 should be at least 50 mm larger and preferably at least 100 mm larger than the copying paper both in the primary and secondary scanning directions, respectively where A4 size paper is used as the largest printing paper.

Intermediate transfer belt 20 is suspended with tension over drive roller 21, energizing roller 22, second transfer facing roller 23, first transfer pre-roller 27 and first transfer roller 28, and is in contact with photosensitive member 10 by means of first transfer roller 28. Drive roller 21 is formed using rubber on its surface A drive force is transmitted to it from main motor 15 via a drive force transmitting device (not shown in the drawing) comprising gears, a timing belt, etc., and drive roller 21 rotates in the direction indicated by an arrow in the drawing. The rotation of drive roller 21 is transmitted to intermediate transfer belt 20, which is conveyed counterclockwise at approximately the same speed as the rotation speed of photosensitive member 10. Energizing roller 22 is given force in the direction indicated by arrow a, providing tension to intermediate transfer belt 20 such that it will not slacken between the rollers. Because of this, the rotation of drive roller 21 is efficiently transmitted to intermediate transfer belt 20.

First transfer roller 28 is given force in the direction indicated by arrow b in order to put intermediate transfer belt 20 into contact with photosensitive member 10, and first transfer bias voltage is applied to it. The toner image formed on photosensitive member 10 is transferred onto intermediate transfer belt 20 by means of the first transfer bias voltage applied to first transfer roller 28. The toner image transferred onto intermediate transfer belt 20 is carried to the area facing second transfer roller 24 while sticking to intermediate transfer belt 20. Grounded second transfer facing roller 23 is located at the area where intermediate transfer belt 20 comes to face second transfer roller 24. Second transfer bias voltage is applied to second transfer roller 24, which can be pressed onto or moved away from intermediate transfer belt 20. Second transfer roller 24 has drive motor 16 located separately from main motor 15. A drive force is transmitted to it from drive motor 16 via a drive force transmitting device (not shown in the drawing) comprising gears, pulleys, a timing belts etc. Second transfer roller 24 may be rotated in the direction indicated by an arrow in the drawing at a speed faster than intermediate transfer belt 20 by using for intermediate drive motor 16 a drive voltage different from that used for main motor 15 and changing the gear ratio, etc., of the drive transmitting device. Second transfer roller 24 shifts its position in response to the carriage of printing paper P. When said second transfer roller 24 is shifted inward, it comes into contact with second transfer facing roller 23 via intermediate transfer belt 20. The number and arrangement of suspension rollers over which intermediate transfer belt 20 is suspended are not limited to the configuration of this embodiment and may be set depending on the configuration of the image forming device.

Intermediate transfer belt cleaner 25 has cleaning blade 26 that can make and lose contact with intermediate transfer belt 20. Cleaning blade 26 is formed using an elastic material such as silicone rubber. When it is in contact with intermediate transfer belt 20, cleaning blade 26 presses against intermediate transfer belt 20 at a maximum pressure of 200 g and removes residual toner on said belt.

First transfer pre-roller 27 is constructed such that one end is fixed and the other end may be shifted (tilted) in the +s and −s directions. By controlling the tilt of first transfer pre-roller 27, the lateral movement of intermediate transfer belt 20 may be controlled. In this embodiment, shifting is executed with regard to the first transfer pre-roller. However, the present invention is not limited to this and another suspension roller or rollers may be selected for this purpose.

Figure 3:
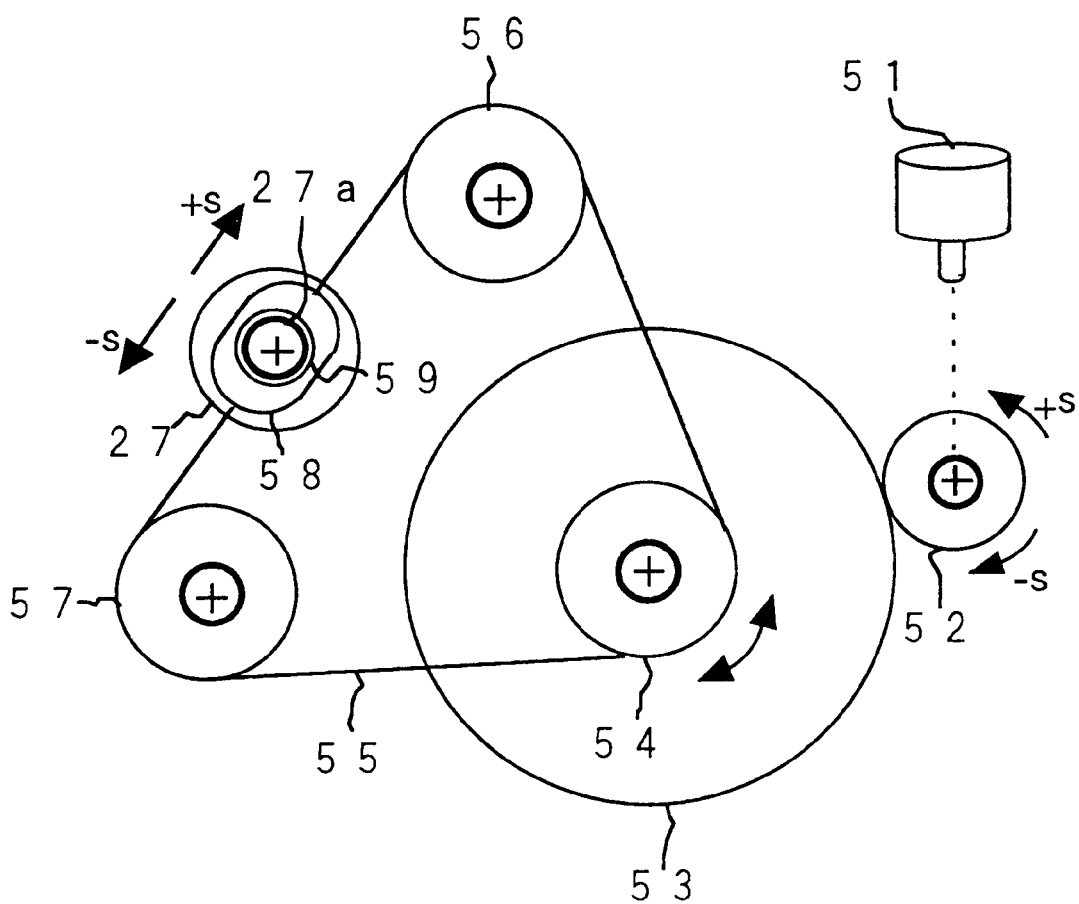
FIG. 3 is a cross-sectional view showing important parts of a roller shifting mechanism.
Figure 4:
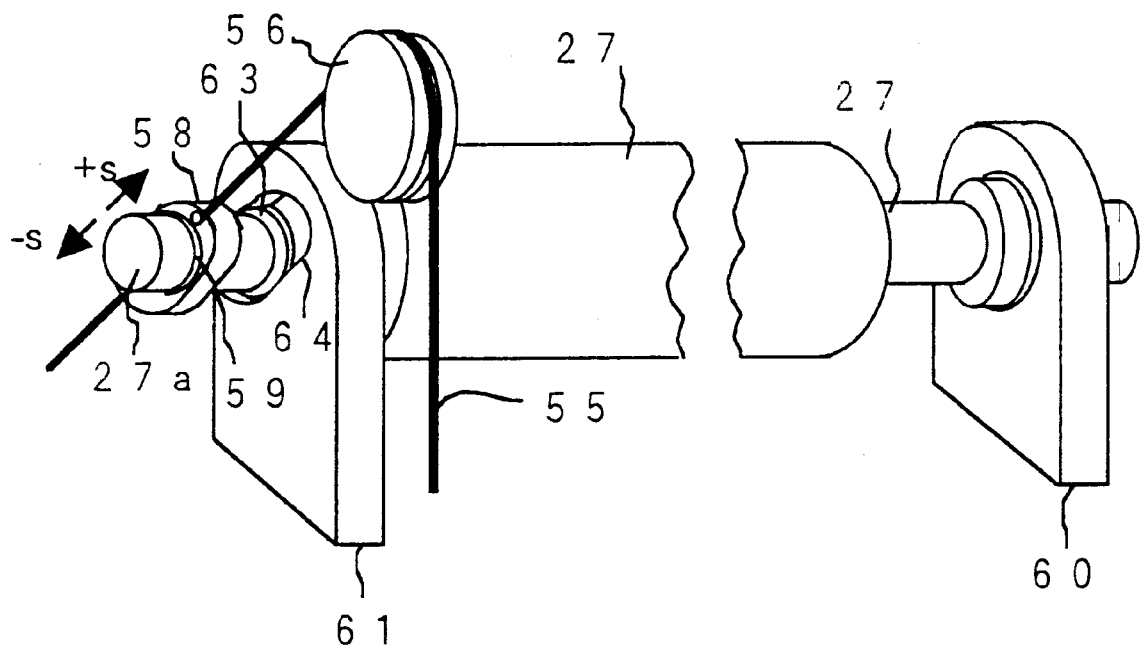
FIG. 4 is an enlarged perspective view showing important areas of the roller shifting mechanism.

FIG. 3 is an enlarged cross-sectional view showing the shifting mechanism of first transfer pre-roller 27. FIG. 4 is an enlarged perspective view showing important areas of the shifting mechanism of first transfer pre-roller 27. The shifting mechanism of first transfer pre-roller 27 is explained with reference to FIGS. 3 and 4.

The shifting mechanism of first transfer pre-roller 27 primarily comprises stepping motor 51, motor gear 52, drive gear 53, drive pulley 54, drive wire 55, idle pulleys 56 and 57 and bearing holder 58 and bearing 59.

Stepping motor 51 can rotate in either direction by a specified angle, and has motor gear 52 attached to its rotational axis. The rotation of stepping motor 51 is transmitted to drive gear 53 via motor gear 52. Stepping motor 51 can rotate motor gear 52 fifty steps in the +s direction and fifty steps in the −s direction. However, in this embodiment, the range of steps is limited to ten steps in the +s direction and ten steps in the −s direction. Drive pulley 54 is located on drive gear 53, said drive pulley being formed as one unit with said drive gear 53. Drive pulley 54 rotates together with drive gear 53 as drive gear 53 rotates. Drive wire 55 is wound around drive pulley 54 and idle pulleys 56 and 57 in a loop fashion. Drive wire 55 is conveyed via the rotation of drive pulley 54. Bearing holder 58 is fixed to drive wire 55 such that bearing 59 may be located between idle pulleys 56 and 57, and it moves in the +s and −s directions by means of drive wire 55.

Bearing holder 58 holds shaft 27a of first transfer pre-roller 27 using bearing 59. Shaft 27a of first transfer pre-roller 27 shifts by 16 μm via the movement of bearing holder 58 each time stepping motor 51 rotates one step.

Furthermore, as shown in FIG. 4, bearing 60 is located on one shaft 27b of first transfer pre-roller 27, and slide bearing 63 and bearing 59 are located on the other shaft 27a. Bearing 60, slide bearing 63 and bearing 59 rotatably hold first transfer pre-roller 27 with shaft 27a and shaft 27b as the rotation axis.

Slide bearing 63 is inserted in regulating hole 64 located in shaft shifting direction regulating plate 61, and can move in regulating hole 64. Bearing 60 is loosely held by bearing holding plate 65. By means of this construction, when slide bearing 63 has moved in regulating hole 64, first transfer pre-roller 27 becomes tilted with bearing 60 as the supporting point. Therefore, through the drive of stepping motor 51, shaft 27a shifts with bearing 60 as the supporting point. The direction and range of shifting of first transfer pre-roller 27 may be regulated by means of the configuration of regulating hole 64.

Figure 5:
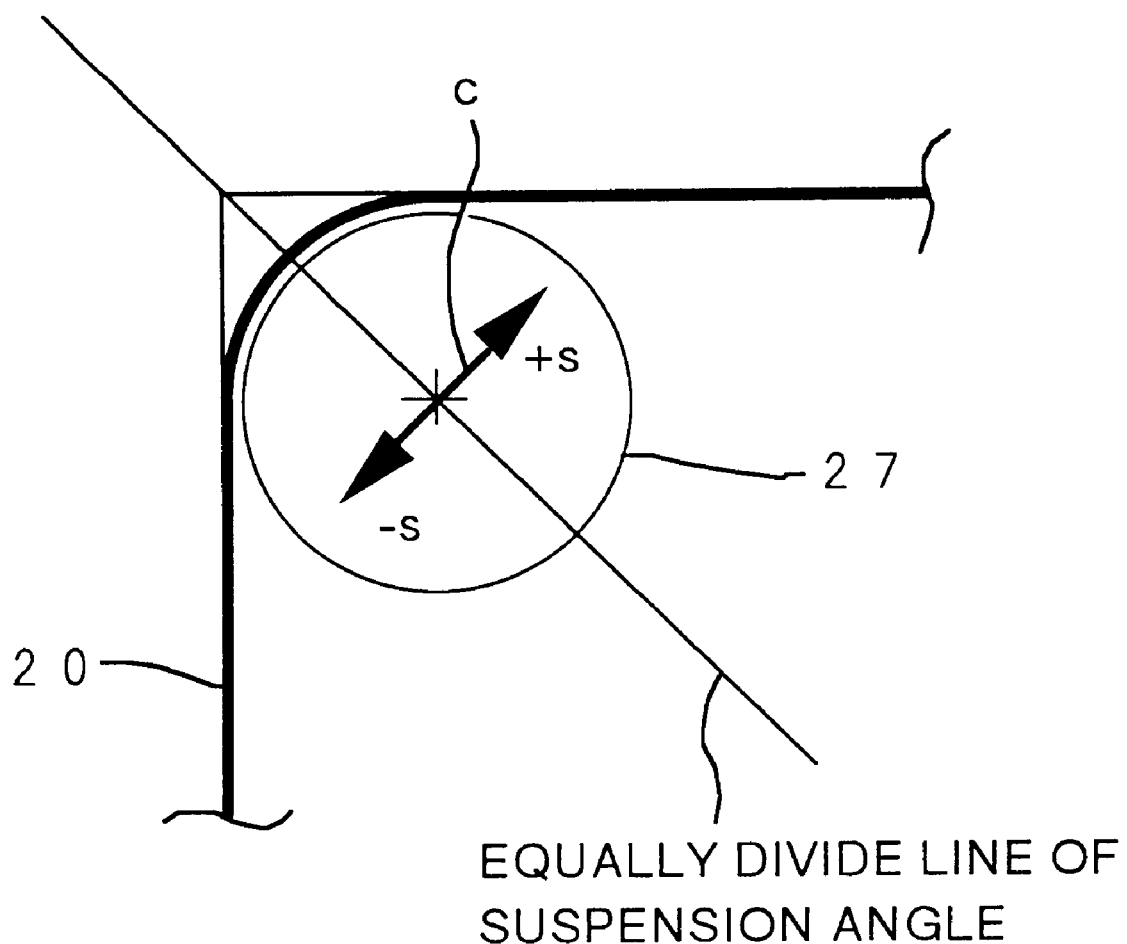
FIG. 5 is a drawing to explain the direction in which the roller is shifted.

Regarding the direction of shifting of first transfer pre-roller 27, it is most efficient to shift first transfer pre-roller 27 in the directions perpendicular to the line that equally divides the suspension angle of intermediate transfer belt 20 over first transfer pre-roller 27, as shown in the drawing in FIG. 5.

Where first transfer pre-roller 27 is shifted from the parallel position, a force that laterally moves intermediate transfer belt 20 is generated. In other words, by shifting first transfer pre-roller 27 by means of stepping motor 51, intermediate transfer belt 20 may be laterally moved such that its position may be adjusted. In this embodiment, first transfer pre-roller 27 is tilted by shifting only one end of said roller. However, it is also acceptable to use a construction in which the roller is tilted by shifting both ends of the roller.

Figure 6:
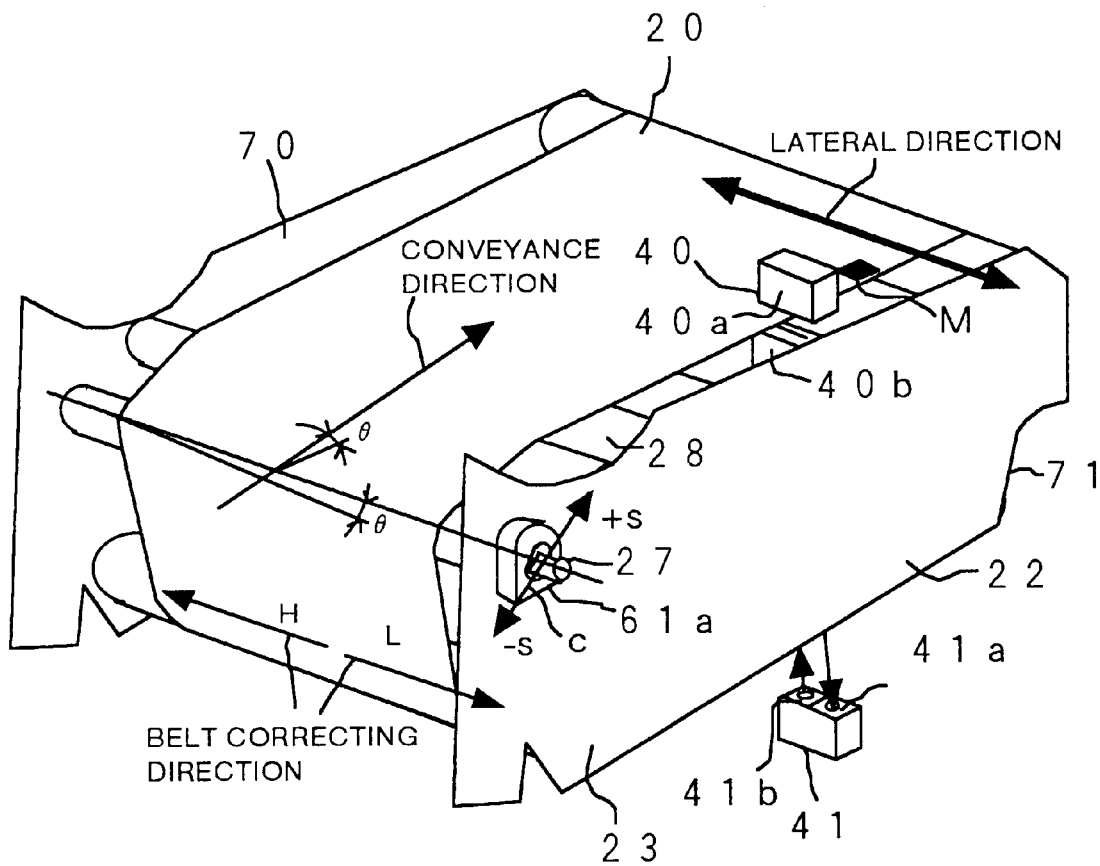
FIG. 6 is a perspective view showing the intermediate transfer unit.

FIG. 6 is a perspective view of intermediate transfer unit 2. In intermediate transfer unit 2, drive roller 21, energizing roller 22, second transfer facing roller 23, first transfer pre-roller 27 and first transfer roller 28 are rotatably located between side panels 70 and 71. Intermediate transfer belt 20 is suspended over said rollers.

Around intermediate transfer unit 2 are located first position detection sensor 40 to detect the lateral position of intermediate transfer belt 20 and second position detection sensor 41 to read the position of intermediate transfer belt 20 in the direction of conveyance First position detection sensor 40 comprises light emitting element 40a and light receiving element 40b, and is constructed such that the light emitted by light emitting element 40a is detected by light receiving element 40b. While Omron's laser parallel light linear sensor (set resolution 2.2 μm) is used for first position detection sensor 40 in this embodiment, as long as the sensor is capable of performing position detection, other sensors may be used instead. On the other hand, second position detection sensor 41 is a reflection-type photosensor in which light emitting element 41a and light receiving element 41b are integrally housed together and is constructed such that light emitted by light emitting element 41a is projected onto an object and light reflected by the object is detected by light receiving element 41b.

Figure 7:
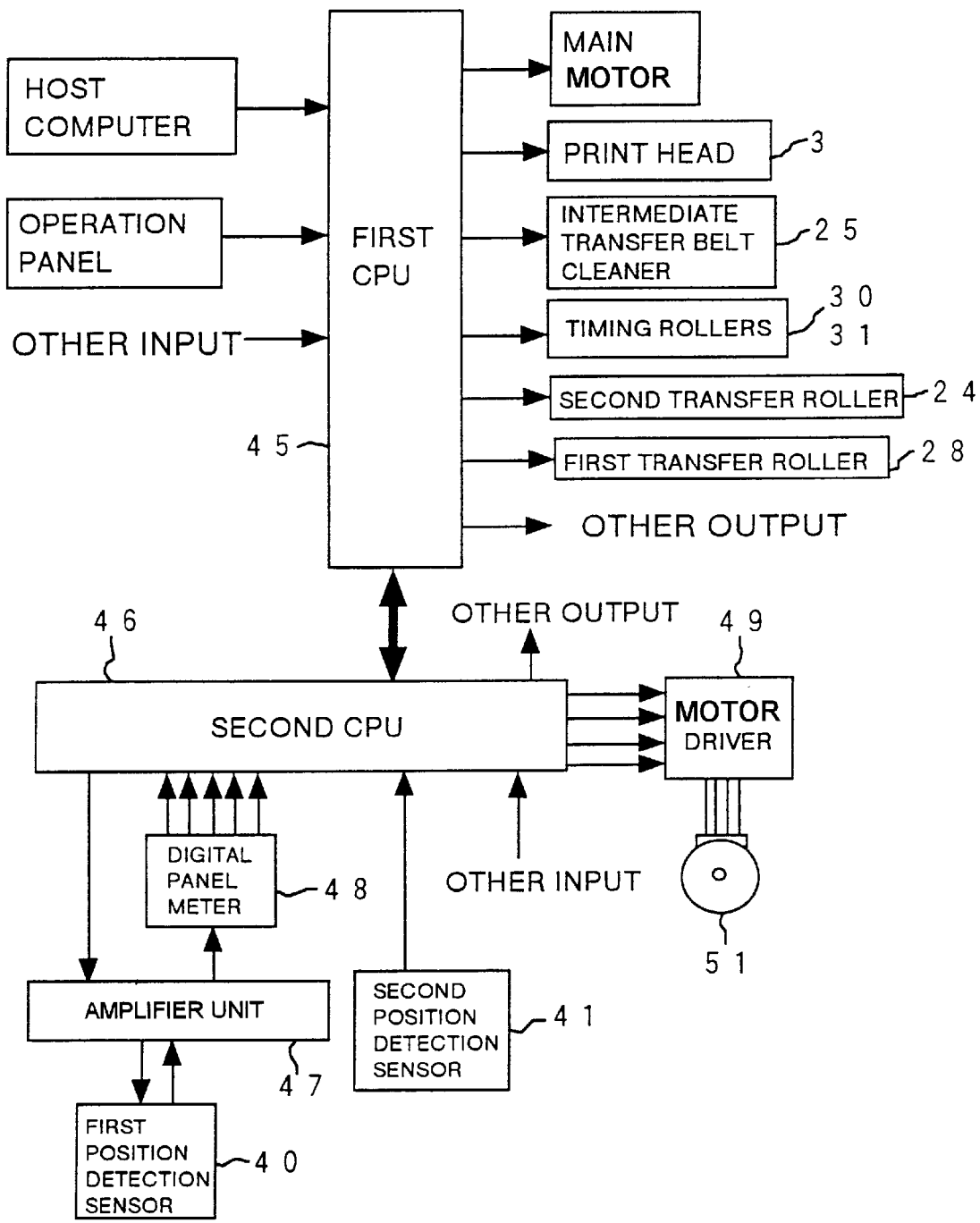
FIG. 7 is a block diagram of a control circuit of an image forming device.

FIG. 7 is a block diagram of the control circuit of image forming device 100. First CPU 45 controls various elements including the main motor, print head 3, intermediate transfer belt cleaner 25, timing rollers 30 and 31, second transfer roller 24 and first transfer roller 28, based on the inputs from the host computer, operation panel, second CPU 46, etc.

Second position detection sensor 41 is connected to second CPU 46. The output value from second position detection sensor 41 is sent to second CPU 46. Second CPU 46 detects timing mark M formed on intermediate transfer belt 20 on the side of side panel 71, and generates a timing signal from the output value from second position detection sensor 41.

First position detection sensor 40 is connected to second CPU 46 via amplifier unit 47 and digital panel meter 48. The output value from first position detection sensor 40 is amplified by amplifier unit 47, after which it is converted into one of five digital signals by digital panel meter 48 and sent to second CPU 46.

Figure 8A:
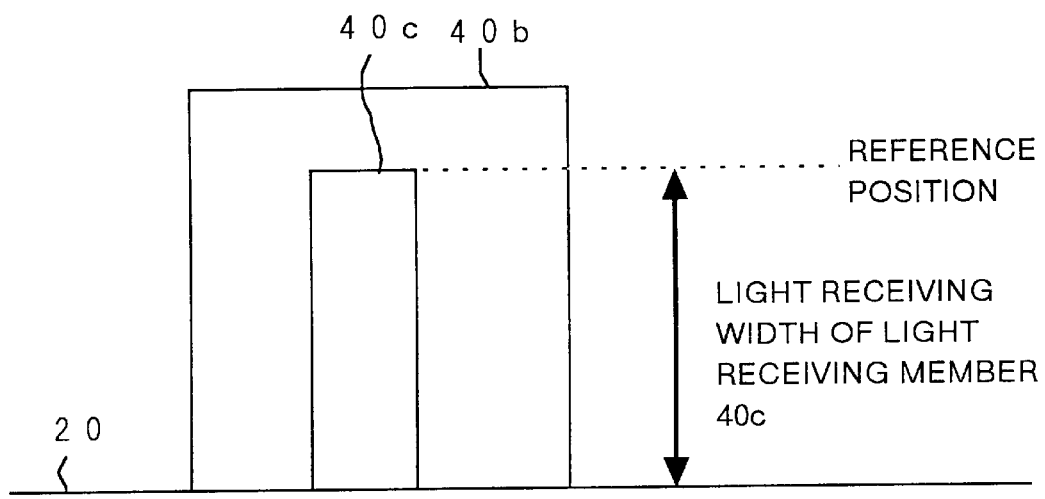
FIG. 8a is a drawing showing the relationship between the belt and a sensor light-receiving area.

FIG. 8a is a drawing showing the relationship between the light receiving width of light receiving member 40c of first position detection sensor 40 and intermediate transfer belt 20. Light receiving member 40c of first position detection sensor 40 outputs a voltage signal proportional to the amount of light received after receiving light from light emitting element 40a. A part of intermediate transfer belt 20 is inserted between light emitting element 40a and light receiving member 40c such that a part of the light irradiated by light emitting element 40a onto light receiving member 40c is blocked. Therefore, light receiving member 40c generates a voltage signal corresponding to the amount of light received by the part not covered by intermediate transfer belt 20.

Figure 8B:
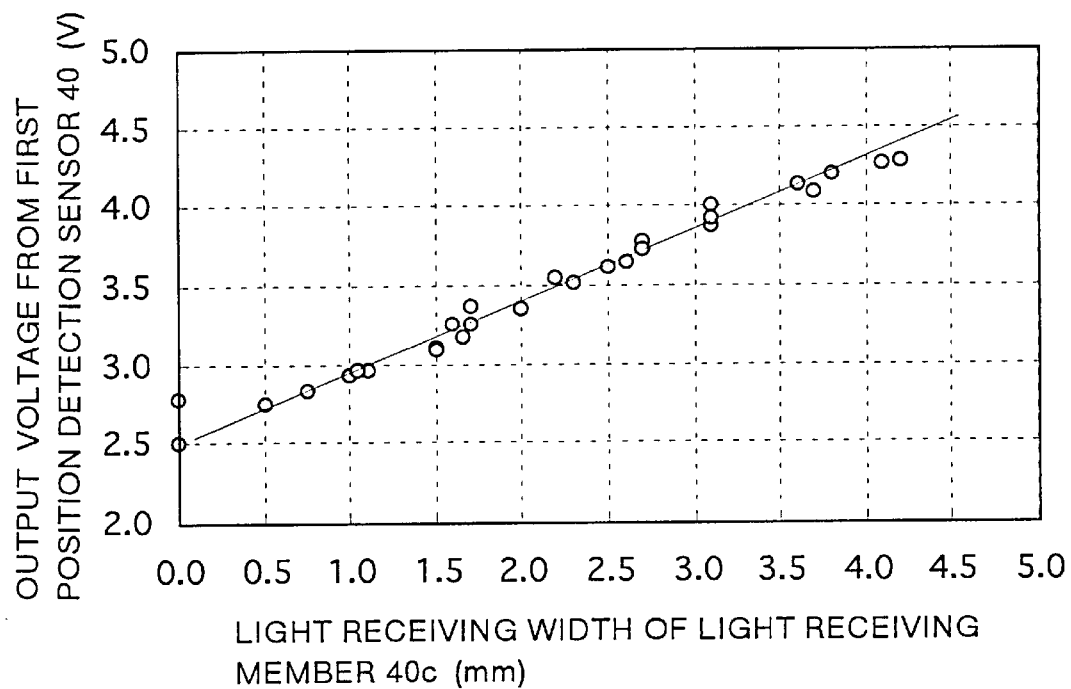
FIG. 8b is a graph showing the relationship between the belt position and the voltage signal from the sensor.

FIG. 8b is a graph showing the relationship between the light receiving width of light receiving member 40c and the voltage output from first position detection sensor 40. From this graph, it is seen that the output voltage from first position detection sensor 40 changes in response to the position of intermediate transfer belt 20. In this embodiment, the direction in which the output value from first position detection sensor 40 increases is deemed direction H, and the direction in which said output value decreases is deemed direction L.

Table 1 shows the relationship between the voltage signal from first position detection sensor 40 and the determination level.

TABLE 1

| Determination level | Intermediate transfer belt reference position | | Reference potential |
|---|---|---|---|
| HH (second level) | | | |
| | 2.090mm | | 3.428V |
| H (first level) | | } 67μm | |
| | 2.023mm | | 3.399V |
| M (target position) | | } 46μm | |
| | 1.977mm | | 3.378V |
| L (first level) | | } 67μm | |
| | 1.910mm | | 3.348V |
| LL (second level) | | | |

Digital panel meter level determination

The reference potential in Table 1 indicates the border value of the voltage signal from position detection sensor 40, and the reference position indicates the position of intermediate transfer belt 20 that corresponds to the reference potential based on the graph in FIG. 8b. The numbers between the reference positions indicate the distances between respective reference positions. The voltage signal from first position detection sensor 40 is amplified by amplifier unit 47 and input to digital panel meter 48. Digital panel meter 48 converts the voltage signal into one of five digital signals (HH, H, Mg L or LL) (hereinafter called 'the determination level') and outputs the same.

This determination level is input to second CPU 46. A timing signal and an intermediate transfer belt drive signal are also input to second CPU 46 from second position detection sensor 41 and first CPU 45, respectively. On the other hand, motor driver 49 that drives stepping motor 51, as well as amplifier unit 47, is connected to the output ports of second CPU 46. Stepping motor 51 is driven by a drive signal output from second CPU 46 and input to motor driver 49, and the light emission by light emitting element 41a of first position detection sensor 40 is controlled by ON/OFF signals output to amplifier unit 47. Since an element that outputs laser light is used for light emitting element 41a in this embodiment, control is carried out in order to ensure safety so that laser light is emitted only when measurement is performed.

If intermediate transfer belt 20 slips, it moves in direction H or direction L, which are perpendicular to the direction of conveyance. On the other hand, where the conveyance of intermediate transfer belt 20 is stable and said belt does not slip, it does not move either in direction H or direction L. The position of first transfer pre-roller 27 in this condition is deemed the stable position. However, in actuality, the condition of belt conveyance changes due to various changes over time, including changes in the ambient conditions, wear of the suspension rollers and deterioration of the belt itself, and therefore the belt conveyance position will not become completely stable. Therefore, the position of first transfer pre-roller 27 at which intermediate transfer belt 20 does not move either in direction H or direction L is deemed the provisional stable position. This provisional stable position changes as the conveyance condition pertaining to intermediate transfer belt 20 changes.

By shifting one end of first transfer pre-roller 27 from the provisional stable position in the +s direction or the −s direction, the position of intermediate transfer belt 20 can be corrected toward direction H or direction L. When one end of first transfer pre-roller 27 is shifted from the provisional stable position in the +s direction or the −s direction so that it becomes tilted by angle θ, first transfer pre-roller 27 becomes tilted by angle θ relative to the direction of conveyance of intermediate transfer belt 20 as well. Therefore, the direction in which first transfer pre-roller 27 conveys intermediate transfer belt 20 also becomes tilted by angle θ. Through this tilting, intermediate transfer belt 20 moves in the direction perpendicular to the direction of conveyance Where first transfer pre-roller 27 is shifted in the +s direction, intermediate transfer belt 20 moves toward direction H, and where first transfer pre-roller 27 is shifted in the −s direction, intermediate transfer belt 20 moves toward direction L.

Amount of movement Δd of intermediate transfer belt 20 is expressed using a general formula shown below, if the length of intermediate transfer belt 20 is l and the tilt angle of first transfer pre-roller 27 is θ.

$$\Delta d > l \times \tan\theta$$

Figure 9:
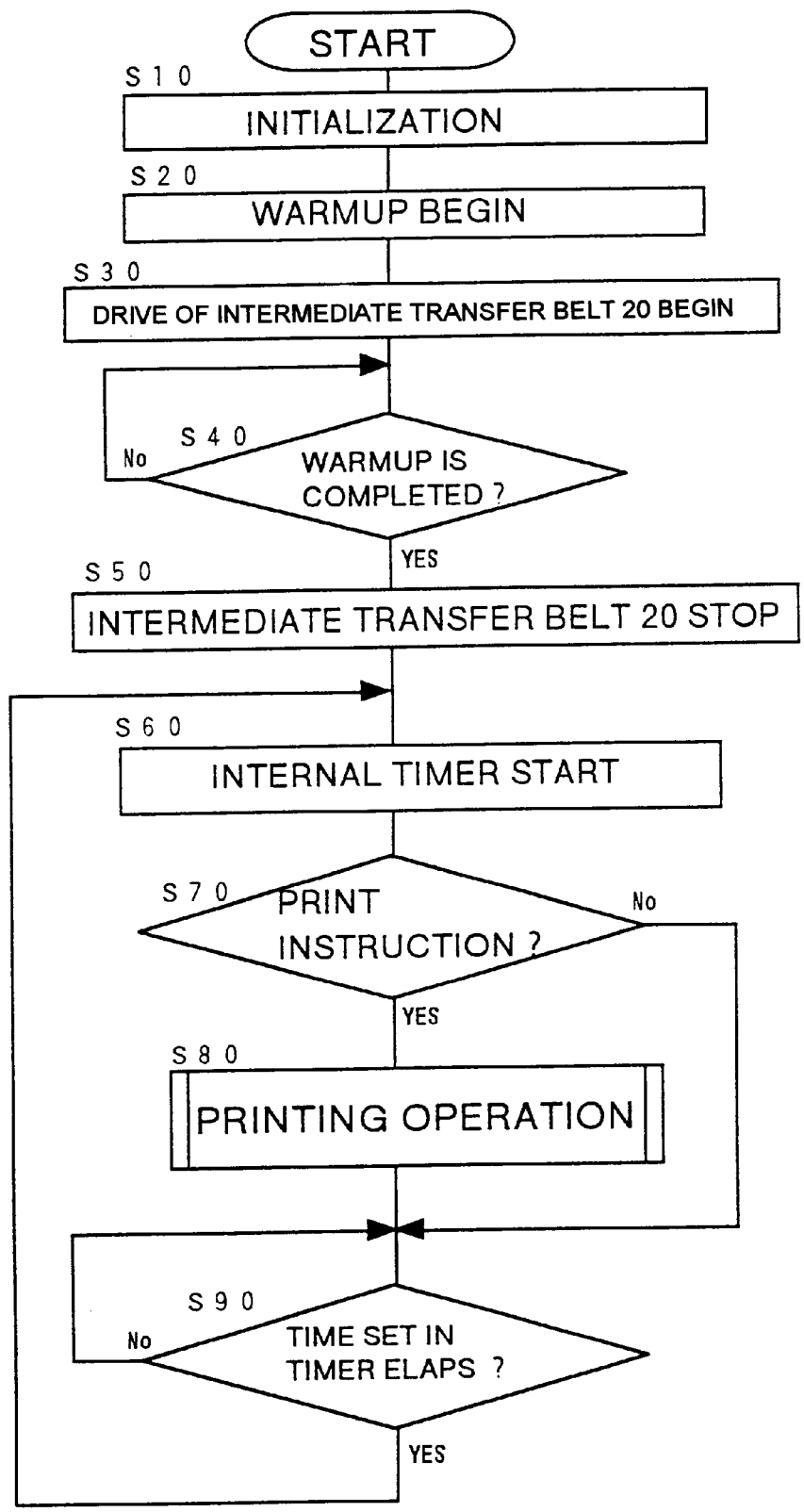
FIG. 9 is a flow chart showing the operation control sequence pertaining to the electrophotographic image forming device.

FIG. 9 is a flow chart showing the operation control sequence of electrophotographic image forming device 100. The control program shown in this operation control flow chart is mainly integrated in first CPU 45 and controls the operations of electrophotographic image forming device 100.

When the main switch of electrophotographic image forming device 100 is turned ON, the sequence of the operation control flow chart begins, and initialization takes place in step S10. When initialization is completed, warmup begins in step S20 and the drive of intermediate transfer belt 20 begins in step S30. Where the drive of intermediate transfer belt 20 begins, an intermediate transfer belt drive signal is sent from first CPU 45 to second CPU 46. When it is determined in step S40 that warmup has been completed, drive of intermediate transfer belt 20 stops in step S50, whereby the preliminary operation is completed.

Then in step S60, an internal timer starts and it is determined in step S70 whether a print instruction has been issued from the host computer. Where a print instruction is not present, the process advances to step S90 and the process returns to step S60 after the time set in the timer elapses.

Where a print instruction from the host computer is present in step S70, the process advances to step S80, in which the printing operation subroutine is executed. When the printing operation subroutine in step S80 is completed, the process advances to step S90. When the time set in the timer has elapsed, the process then returns to step S60.

Figure 10:
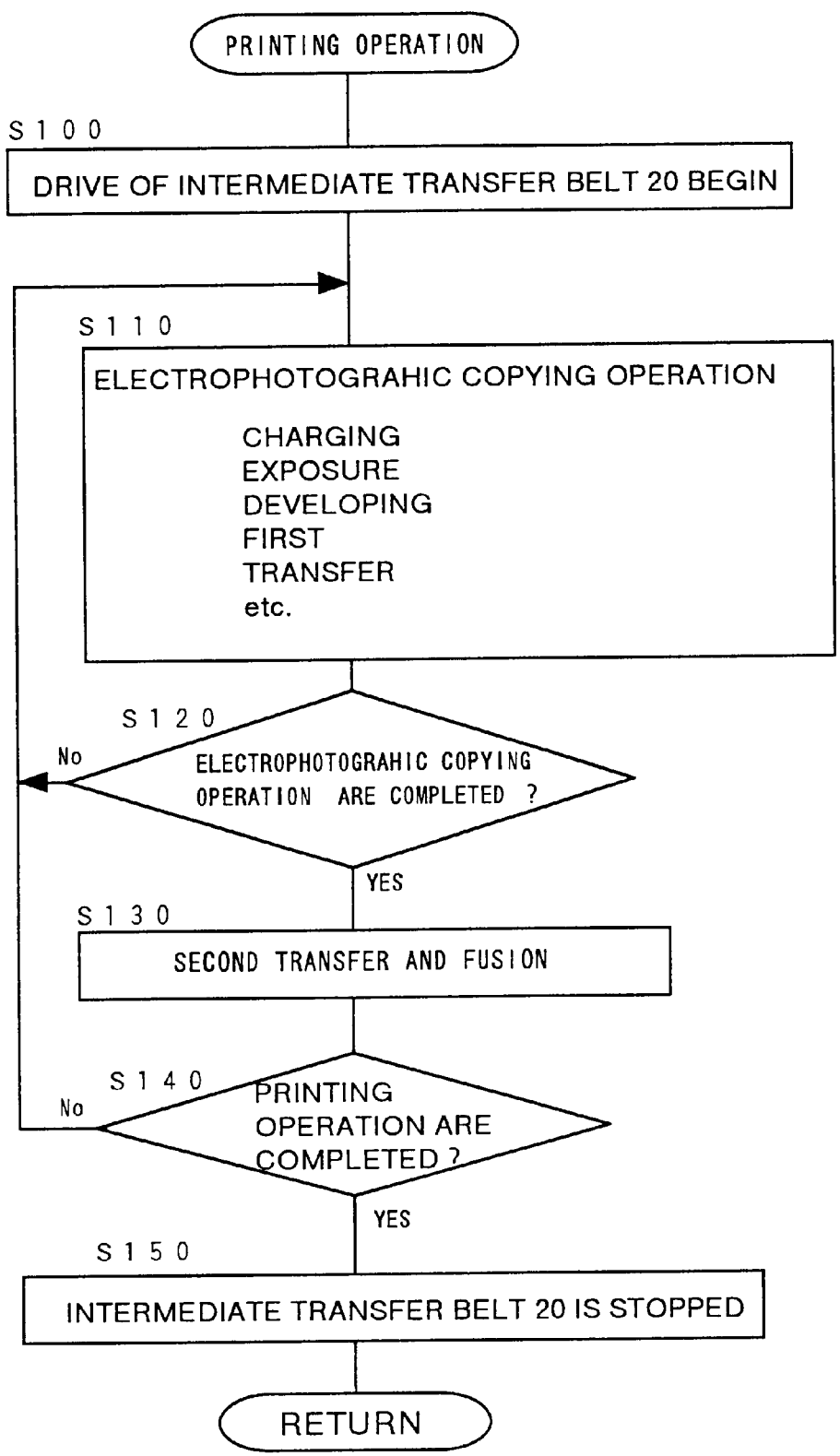
FIG. 10 shows a printing operation subroutine of the operation control flow chart.

FIG. 10 shows the printing operation subroutine (step S80) in the operation control flow chart of FIG. 9.

When the process enters the printing operation subroutine of step S80 in the operation control flow chart, the drive of intermediate transfer belt 20 begins in step S100 and an electrophotographic copying operation is carried out in step S110. Here again, where the drive of intermediate transfer belt 20 begins, an intermediate transfer belt drive signal is sent from first CPU 45 to second CPU 46. Photosensitive unit 1, intermediate transfer unit 2, print head 3, developing unit 4, etc., are controlled in the electrophotographic copying operation of step S110, and the electrophotography process including charging, exposure, developing and first transfer is executed. Through this electrophotographic image forming operation, a toner image is formed on intermediate transfer belt 20.

It is then determined in step S120 whether or not the electrophotographic image forming operation has been completed, and the electrophotographic image forming operation of step S110 is repeated if necessary. For example, where a full-color image is to be formed, the electrophotographic image forming operation is repeated until four-color images are formed on intermediate transfer belt 20 and image overlapping is completed. When the completion of the electrophotographic image forming operation is confirmed in step S120 second transfer and fusion are carried out in step S130 and an image is output. It is determined in step S140 whether or not one or more prescribed printing operations are completed. Where two or more printing operations are specified, the operations of steps S110 through S130 are repeated as many times as specified, and two or more images are output. When all printing operations have been completed the drive of intermediate transfer belt 20 is stopped in step S150 and the process returns to the main routine flow chart.

Figure 11:
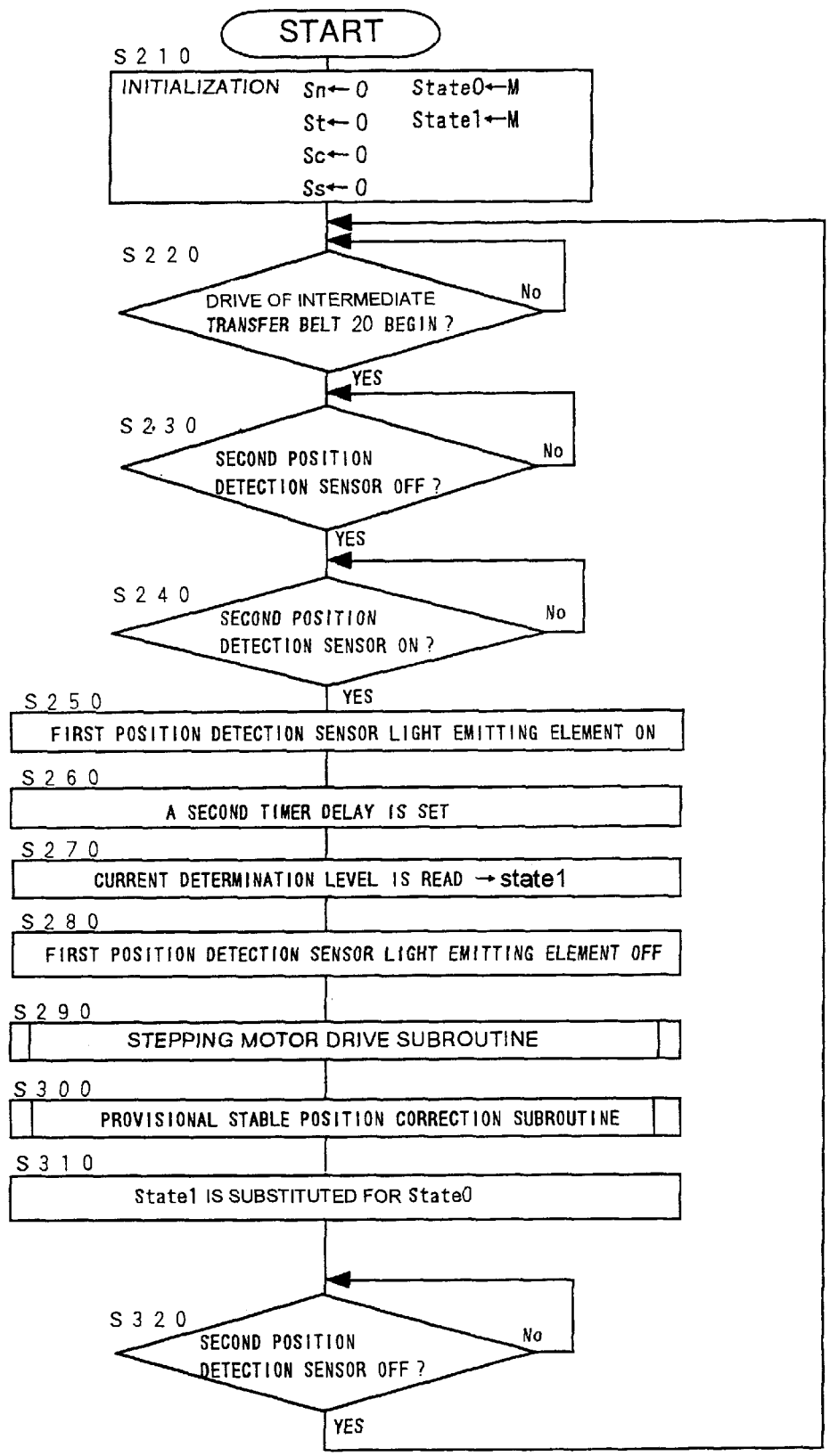
FIG. 11 is a belt slippage correcting operation flow chart.

FIG. 11 is a belt slippage correcting operation flow chart. The sequence of the belt slippage correcting operation flow chart is stored in second CPU 46 and is executed in tandem with first CPU 45. When the main switch is turned ON and second CPU 46 starts running initialization takes place first in step S210 in which 0 is substituted for variables Sn (the current step position of the stepping motor), St (the value read from the slippage correction table), Sc (the number of steps by which to drive the stepping motor), and Ss (the provisional stable position). The initial phase is given to stepping motor 510 For example, where a four-phase stepping motor is used for stepping motor 51, (HH, H, L, LL) are output respectively for the four phases (A+, B+, A−, B−). The output of laser diode, light emitting element 40a of first position detection sensor 40, is then turned OFF and the delay timer to stabilize the output of the laser diode is initialized. Further, central position M is substituted for variable State0 that indicates the previous determination level and variable State1 that indicates the current determination level.

When initialization is completed, the process advances to step S220, in which it is determined whether or not an intermediate transfer belt drive signal has been issued from first CPU 45. The process waits in this step until an intermediate transfer belt drive signal is sent. When an intermediate transfer belt drive signal is sent, the process advances to step S230.

Next, in steps S230 and S240, the rising of a timing signal output from second position detection sensor 41, to detect a mark indicating a reference position on intermediate transfer belt 20, is detected.

When the rising of a timing signal is detected in steps S230 and S240, light emitting element 40a of first position detection sensor 40 is turned ON in step S250 and the process advances to step S260.

In step S260, a second timer delay is set to stabilize light emitting element 40a of first position detection sensor 40.

When the timer set in step S260 counts up to the set time, the current determination level is read from digital panel meter 48 and is substituted for variable State1. When the reading from digital panel meter 48 is completed, the output of light emitting element 40a of first position detection sensor 40 is turned OFF in step S280.

The stepping motor drive subroutine of step S290 and the provisional stable position correction subroutine of step S300 are then carried out. The details of the stepping motor drive subroutine of step S290 and the provisional stable position correction subroutine of step S300 are described below.

After the value of current determination level variable State1 is substituted for previous determination level variable State0 in step S310 the process waits for the timing signal of second position detection sensor 41 to turn OFF in step S320 and then returns to step S220.

Figure 12:
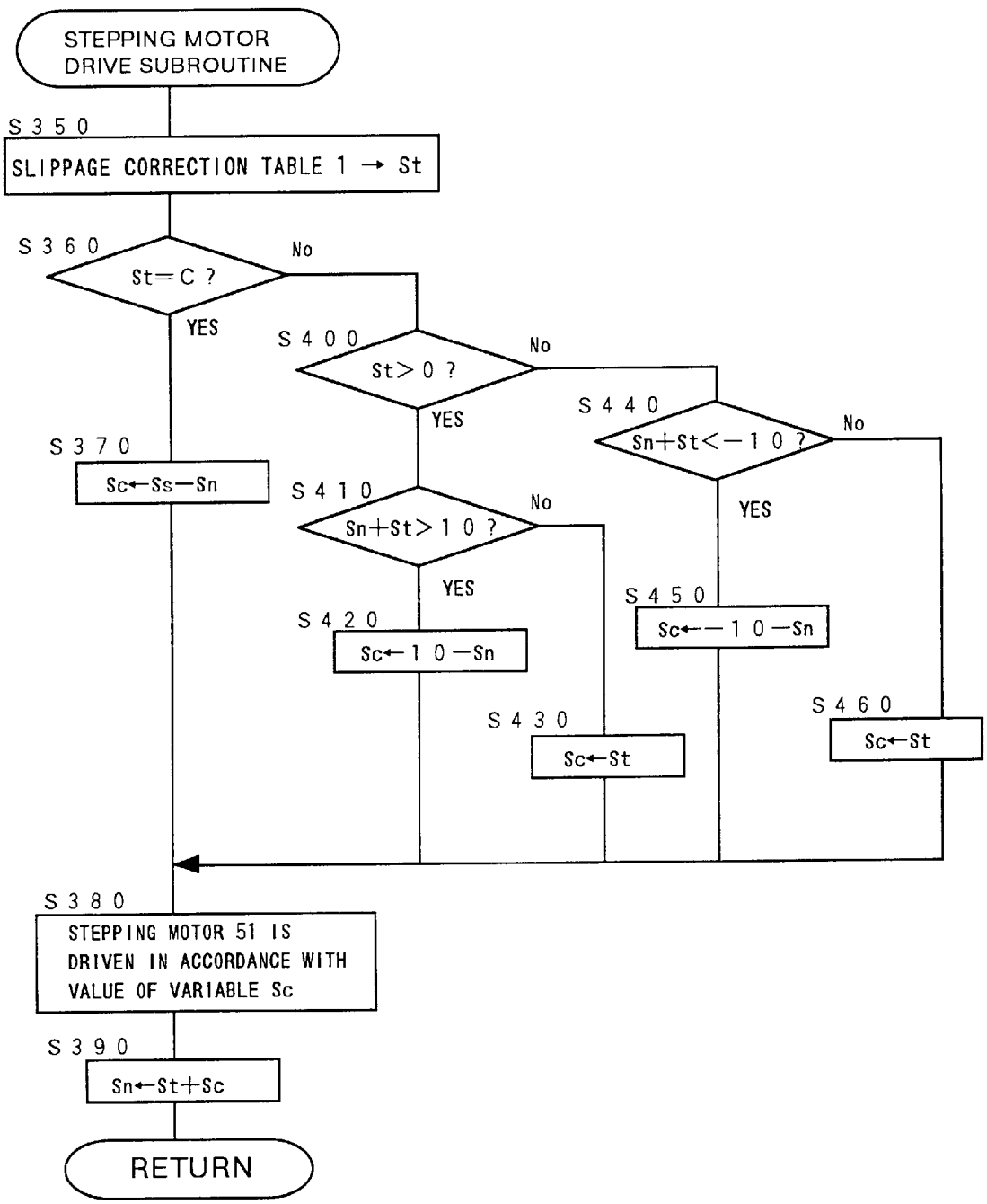
FIG. 12 shows a stepping motor drive subroutine of the belt slippage correcting operation.

FIG. 12 is the stepping motor drive subroutine of step S290 in the belt slippage correcting operation flow chart.

When the stepping motor drive subroutine of step S290 is called in the belt slippage correcting operation flow chart, the value located at the intersection of the row indicated by the previous determination level (variable State0) and the column indicated by the current determination level (variable State1) of the slippage correction table 1 shown in Table 2 is read and substituted for variable St (the value read from the slippage correction table).

TABLE 2

Slippage correction table 1

| | | Current determination level | | | | |
|---|---|---|---|---|---|---|
| | | HH | H | M | L | LL |
| Previous | HH | −1 | 0 | C | C | C |
| determination | H | −2 | −1 | C | C | +6 |
| level | M | −6 | −1 | 0 | +1 | +6 |
| | L | −6 | C | C | +1 | +2 |
| | LL | C | C | C | 0 | +1 |

Slippage correction table 1 shown in Table 2 is explained below.

The symbols + and − attached to the numbers indicate the direction of rotation of stepping motor 51. In other words, the + symbol indicates the rotation of stepping motor 51 in the +s directions while the − symbol indicates the rotation of stepping motor 51 in the −s direction.

C means that first transfer pre-roller 27 should be returned to the provisional stable position, and varies depending on the direction of rotation of stepping motor 51 and the control conditions at that time.

Slippage correction table 1 shown in Table 2 will now be explained.

Where the previous determination level is M and the current determination level is M, the lateral position of intermediate transfer belt 20 is M, which is the target position, and there is no need for correction. Therefore, stepping motor 51 is not driven.

Where the previous determination level is M and the current determination level is H, this means that intermediate transfer belt 20 has shifted laterally from target position M to the H side, and therefore it is necessary to return it to target position M. In order to gradually return intermediate transfer belt 20 to target position N, stepping motor 51 is rotated in the minus direction by one step. By making the number of steps one, sudden lateral movement of intermediate transfer belt 20 can be prevented. If the provisional stable position is appropriate, intermediate transfer belt 20 should not move from target position M in terms of its lateral position. However, the fact that the belt moves from target position M to the H side means that the provisional stable position was wrong. Therefore, it is necessary to change the provisional stable position toward the minus direction. This change is carried out in the provisional stable position correction subroutine explained below.

Where the previous determination level is M and the current determination level is HH, this means that intermediate transfer belt 20 suddenly has shifted laterally from target position M to the H side. Therefore, it is determined that some contingency has taken place and stepping motor 51 is immediately rotated by six steps in the minus direction.

Where the previous determination level is H and the current determination level is L, this means that intermediate transfer belt 20 has shifted laterally from the first level on the H side to the first level on the L side, passing target position M. Therefore, it is determined that excessive correction and overshoot have occurred, and first transfer pre-roller 27 is returned to the provisional stable position for the time being.

Where the previous determination level is H and the current determination level is M, this means that intermediate transfer belt 20 that was on the H side has returned to the target position in terms of its lateral position. Therefore, first transfer pre-roller 27 is returned to the provisional stable position.

Where the previous determination level is H and the current determination level is H, this means that intermediate transfer belt 20 continues to be at the first level on the H side in terms of its lateral position. Therefore, it is necessary to gradually return intermediate transfer belt 20 to target position M. For this purpose, stepping motor 51 is rotated by one step in the minus direction. Here, the amount of movement of stepping motor 51 is limited to one step in order to avoid sudden lateral movement of intermediate transfer belt 20.

Where the previous determination level is H and the current determination level is HH, this means that intermediate transfer belt 20 has shifted further over to the H side, i.e., from the first level to the second level on the H side, in terms of its lateral position. Therefore, it is necessary to prevent intermediate transfer belt 20 from moving further over to the H side from target position M. For this purpose, stepping motor 51 is rotated by two steps in the minus direction. By limiting the amount of movement of stepping motor 51 to two steps, sudden lateral movement of intermediate transfer belt 20 is avoided here.

Where the previous determination level is HH and the current determination level is LL, this means that intermediate transfer belt 20 that was at the second level on the H side has shifted laterally to the second level on the L side, passing target position M. Therefore, it is determined that excessive correction and overshoot have occurred, and first transfer pre-roller 27 is returned to the provisional stable position.

Where the previous determination level is HH and the current determination level is L, this means that intermediate transfer belt 20 that was at the second level on the H side has shifted laterally to the first level on the L side, passing target position M. Therefore, it is determined that excessive correction and overshoot have occurred, and first transfer pre-roller 27 is returned to the provisional stable position.

Where the previous determination level is HH and the current determination level is M, this means that intermediate transfer belt 20 has returned to target position M in terms of its lateral position. Therefore, first transfer pre-roller 27 is returned to the provisional stable position.

Where the previous determination level is HH and the current determination level is H, it is determined that intermediate transfer belt 20 that was at the second level on the H side is gradually returning to target position M in terms of its lateral position, and in order to make sure that said belt is properly returning to said target position, the angle of first transfer pre-roller 27 is maintained.

Where the previous determination level is HH and the current determination level is HH, this means either that intermediate transfer belt 20 is stable at the second level on the H side or is moving further over to the H side from said second level in terms of its lateral position. In either case, in order to return intermediate transfer belt 20 to target position M, it is necessary to control stepping motor 51 such that said belt may move to the L side. When this is done, the amount of movement is made small by limiting the number of steps used to rotate stepping motor 51 to one. This is done in order to prevent intermediate transfer belt 20 from suddenly changing its lateral position when it is stable at the second level on the H side.

Where the previous determination level is L and the current determination level is H, this means that intermediate transfer belt 20 that was at the first level on the L side has shifted laterally to the first level on the H side, passing target position M. Therefore, it is determined that excessive correction and overshoot have occurred, and first transfer pre-roller 27 is returned to the provisional stable position.

Where the previous determination level is L and the current determination level is HH, this means that intermediate transfer belt 20 that was at the first level on the L side has shifted laterally to the second level on the H side, passing target position M. Therefore it is determined that excessive correction and overshoot have occurred and first transfer pre-roller 27 is returned to the provisional stable position.

Where the previous determination level is LL and the current determination level is HH, this means that intermediate transfer belt 20 that was at the second level on the L side has shifted laterally to the second level on the H side, passing target position M. Therefore it is determined that excessive correction and overshoot have occurred, and first transfer pre-roller 27 is returned to the provisional stable position.

A value set in this way is substituted for variable St in step S350, after which it is determined in step S360 whether this variable St is C, or in other words, whether or not movement to the provisional stable position is instructed.

Where variable St is C, the difference between variable Ss (the provisional stable position) and variable Sn (the current step position of the stepping motor) is substituted for variable Sc (the number of steps by which to drive the stepping motor) in step S370 and the process advances to step S380. Where variable St is not C, the process advances to step S400 at which the process advances in one of two routes, one being the case where variable St is positive and another the case where variable St is not positive.

Where variable St is determined to be positive in step S400, the process advances to step S410, in which it is determined whether or not a value obtained by adding variable St (the value read from the slippage correction table) to variable Sn (the current step position of the stepping motor) exceeds 10, which is the upper limit of the stepping motor 51 movable range. Where this value exceeds 10, the process advances to step S420 in which the upper limit is set by substituting (10−Sn) for variable Sc (the number of steps by which to drive the stepping motor) such that stepping motor 51 may rotate to the upper limit. The process then advances to step S380.

Where the sum of variables Sn and St is determined to be 10 or less in step S410, the process advances to step S430 in which variable St (the value read from the slippage correction table) is substituted for variable Sc (the number of steps by which to drive the stepping motor) The process then advances to step S380.

Where variable St is determined not to be positive in step S400, the process advances to step S440, in which it is determined whether or not the sum of variables Sn and St is less than −10.

Where said sum is determined to be less than −10 in step S440, the process advances to step S450 in which (−10−Sn) is substituted for variable Sc such that stepping motor 51 may rotate to the lower limit. The process then advances to step S380.

Where said sum is determined not to be less than −10 in step S440, the process advances to step S460 in which variable St is substituted for variable Sc, and the process advances to step S380.

In step S380, stepping motor 51 is driven in accordance with the value of variable Sc.

While in this embodiment a stepping motor, the upper limit and lower limit of whose movable range are +50 and −50, is used and the upper limit and lower limit are set at +10 and −10, respectively, it is also acceptable to use a stepping motor having different movable range upper and lower limits and a different minimum stepping angle where necessary. By having a smaller minimum stepping angle, more precise control becomes possible.

Finally, in step S390, the value of variable Sn (the current step position of the stepping motor) is replaced with the sum of variable St (the value read from the slippage correction table) and variable Sc (the number of steps by which to drive the stepping motor), and the process returns to the routine of the belt slippage correcting operation flow chart.

While target position M is set and the belt is returned to target position M in terms of its lateral position in this example, as long as the purpose is to prevent slippage, it is not necessary to set a target position, and the conveyance of the belt may be stabilized at a prescribed position. However, the belt is laterally slipping at all times. As a result, if the conveyance is stabilized at a prescribed position, the stabilization position gradually shifts and eventually exceeds the limit determined by the widths of the suspension rollers and the range in which slippage can be detected. In order to prevent the occurrence of this phenomenon, control is carried out in this example such that the belt returns to target position M in terms of its lateral position.

Figure 13:
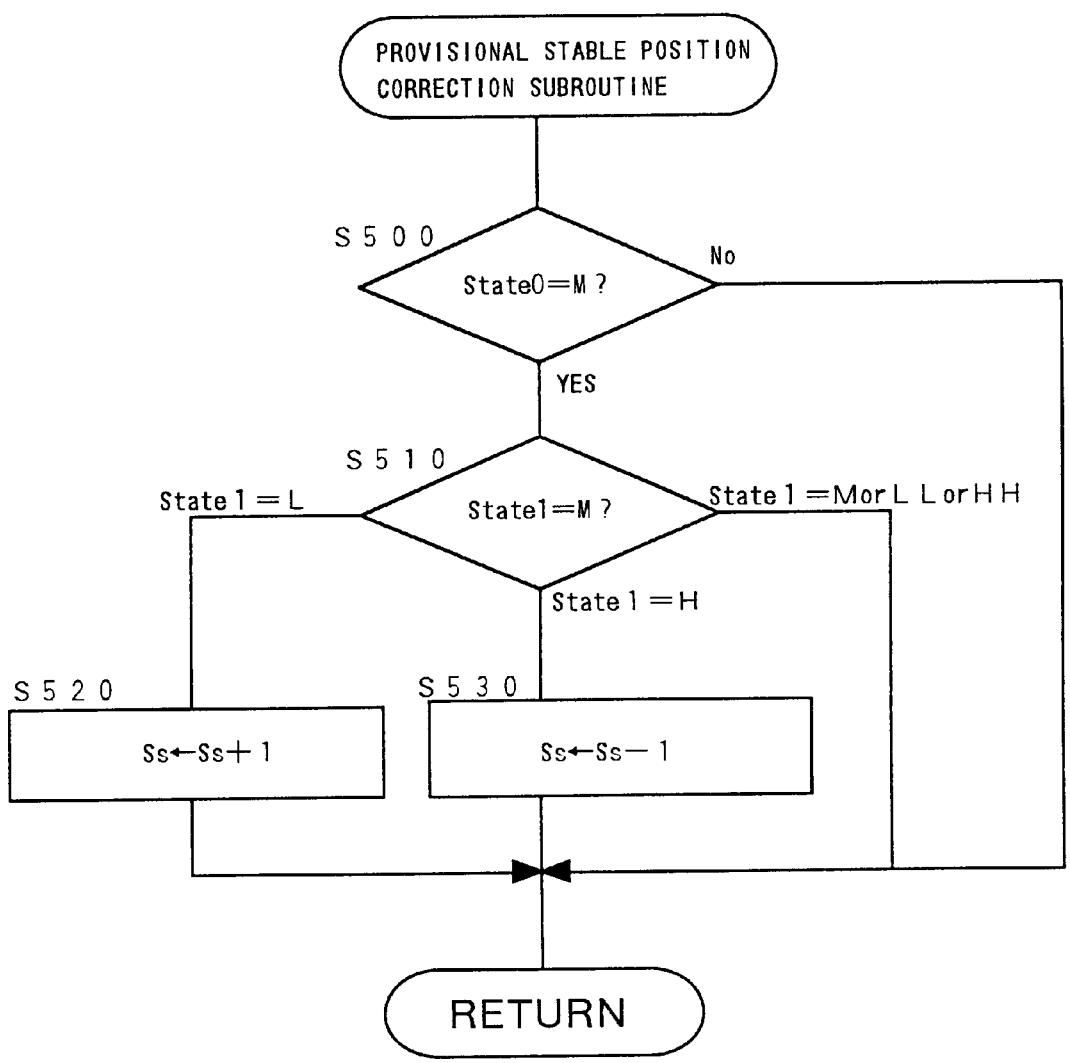
FIG. 13 is a provisional stable position correction subroutine of the belt slippage correcting operation.

FIG. 13 shows the provisional stable position correction subroutine shown in the belt slippage correcting operation flow chart.

When the provisional stable position correction subroutine of step S300 is called in the belt slippage correcting operation flow chart, first, in step S500, it is determined whether or not State0 (the previous determination level) is M. Where the result of this determination is NO, no correction is made to variable Ss that indicates the provisional stable position and the process returns to the routine of the belt slippage correcting operation flow chart. Where the result is YES, the process advances to step S510.

In step S510, the process takes different routes depending on the value of State1, the current determination level (LL, L, M, H or HH).

Where the value of State1 is L in step S510, the process advances to step S520, in which variable Ss is increased by 1 and the process returns to the routine of the belt slippage correcting operation flow chart. This is because intermediate transfer belt 20 that was at target position M has shifted laterally to the L side, and therefore it is necessary to correct the provisional stable position.

Where the value of State1 is H in step S510, the process advances to step S530 in which variable Ss is reduced by 1 and the process returns to the main routine of the belt slippage correcting operation flow chart. This is because intermediate transfer belt 20 that was at target position M has shifted laterally to the H side, and therefore it is necessary to correct the provisional stable position.

Where the value of State1 is M, LL or HH in step S510, the process returns to the routine of the belt slippage correcting operation flow chart without any further operation being performed.

As described above, by carrying out the provisional stable position correction subroutine, stable belt conveyance with the belt positioned at target position M, in which the belt does not slip, becomes possible.

Figure 14:
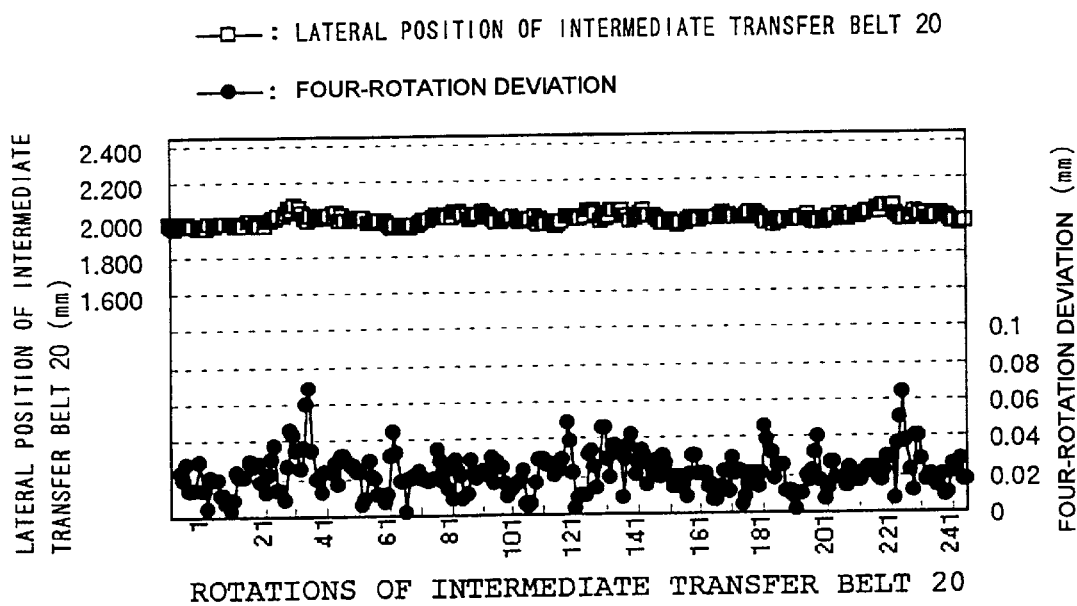
FIG. 14 is a graph showing the result of the belt slippage correction based on the present invention.

FIG. 14 is a graph showing the result of the belt slippage correcting operation based on the present invention.

The conditions of the experiment were set as shown below:
Length of intermediate transfer belt 20: 640 mm
Width of intermediate transfer belt 20: 350 mm
Intermediate transfer belt 20 conveyance speed: 150 mm/sec.
Tension of intermediate transfer belt 20: 1 Kgf
Suspension angle of intermediate transfer belt 20 over first transfer pre-roller 27: 90 degrees
Material of first transfer pre-roller 27: Rubber (EPDM)
Diameter of first transfer pre-roller 27: ø30
Minimum tilt amount: 16 $\mu$m/step Target value M in terms of the lateral position of intermediate transfer belt 20 was set to be 2 mm. Since it is set in this experiment such that bearing 59 shifts by 16 $\mu$m each time stepping motor 51 rotates by one step and the distance between bearing 59 and bearing 60 is 380 mm, shift angle θ of first transfer pre-roller 27 can be expressed as tan θ=0.016/380.

The graph shown in FIG. 14 is derived by calculating the changes in the lateral position of intermediate transfer belt 20 and four-rotation deviations obtained as a result of this experiment and plotting said changes and four-rotation deviations for every four rotations of intermediate transfer belt 20 (rotations 1 through 4, 2 through 5, 3 through 6, ...)
A four-rotation deviation is a deviation of the measured value of the lateral position while intermediate transfer belt 20 rotates four times. If a sudden shifting of the belt takes place, this four-rotation deviation increases.

It is seen from the graph shown in FIG. 14 that intermediate transfer belt 20 is controlled to be around the 2 mm position and the four-rotation deviation is also controlled to be within approximately 60 $\mu$m, although there are several values that deviate from this range. While the target value in terms of the lateral position of intermediate transfer belt 20 was set at 2 mm in this experiments this value may be set otherwise depending on the construction of the belt, which is the target of control, and the configuration of the lateral position detection sensors.

As is clear from this graph, by using the present invention, the slippage of the belt can be corrected and at the same time the speed of lateral movement of the belt can be held to a certain level or lower. If the speed of lateral movement of the belt can be held to a certain level or lower, in the case of an image carrying belt such as an intermediate transfer belt or a belt-shaped photosensitive member in particular, inconveniences such as positional discrepancies of dots among images of different colors, straight line distortion and color discrepancies may be reduced. For example, where a straight line is to be formed along the direction in which the intermediate transfer belt is conveyed, if the intermediate transfer belt moves laterally, the formed image of the straight line becomes distorted. By holding the lateral movement speed of the intermediate transfer belt to a certain level or lower, the distortion of straight lines may be minimized. In particular, since the resolution of the human eye is only around 8 cycles/mm, which may be converted into 62.5 $\mu$m (1 mm/16 lines) in terms of positional discrepancy, as long as the positional discrepancy is within a 60 $\mu$m range, a human eye can hardly see any difference. Because the length of intermediate transfer belt 20 used in this experiment is 640 mm, where intermediate transfer belt 20 rotates once with first transfer pre-roller 27 shifted by angle θ, if the amount of lateral movement of intermediate transfer belt 20 is Δd, tan θ=Δd/640 results and Δd becomes 27 $\mu$m. Since 27 $\mu$m is a value well below the resolution capabilities of the human eye, distortion and color discrepancies in the image due to lateral movement of intermediate transfer belt 20 are not recognized. Incidentally, if the discrepancy as to one dot of the formed image is to be lower than the recognition limit, Δd should preferably be 60 $\mu$m (one dot for a 400 dpi laser optical system).

Figure 15:
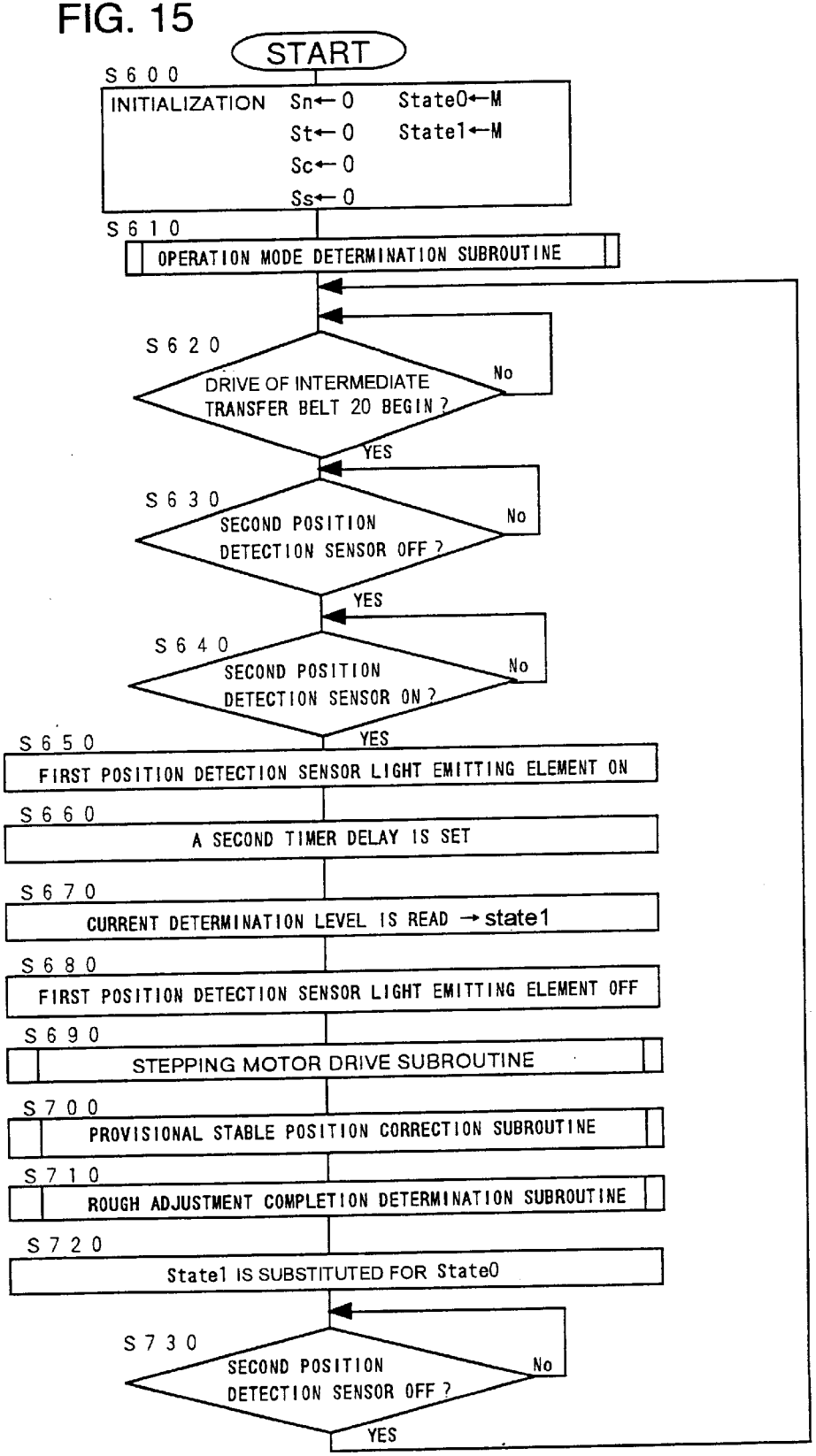
FIG. 15 is a flow chart showing another example of the belt slippage correcting operation.

FIG. 15 is a belt slippage correcting operation flow chart showing another example of the belt slippage correcting operation. In this belt slippage correcting operation, the belt is moved close to a pre-set target position using a method in which different controls are used when the main switch is turned ON or the machine has returned from trouble, such as jamming or a failure of the image forming device, and during the regular copying process, such that occurrence of color discrepancies and image discrepancies is reduced and accuracy is increased The sequence of the slippage correcting operation flow chart shown in FIG. 15 is different from the slippage correcting operation flow chart shown in FIG. 11, in that an operation determination subroutine of step S610 and a rough adjustment completion determination subroutine of step S710 are added and the sequence of the provisional stable position correction subroutine in step S700 is different.

Other than that the former flow chart is the same as the latter flow chart. Therefore, the slippage correcting operation flow chart shown in FIG. 15 will be explained focusing on differences from the slippage correcting operation flow chart shown in FIG. 11.

When second CPU 46 operates based on the turning ON of the main switch or the machine's return from a trouble state, initialization takes place in step S600, following which the process enters the operation mode determination subroutine in step S610. Where a slippage correcting operation was executed previously and data such as provisional stable position Sc has been replaced step S600 may be skipped. However, where there is a possibility that the tilt of first transfer pre-roller 27 may change in the process of returning from a trouble state such as jamming because of the mechanical construction, it is better to carry out step S600 because if the tilt of first transfer pre-roller 27 changes, the previous provisional stable position is rendered meaningless.

Figure 16:
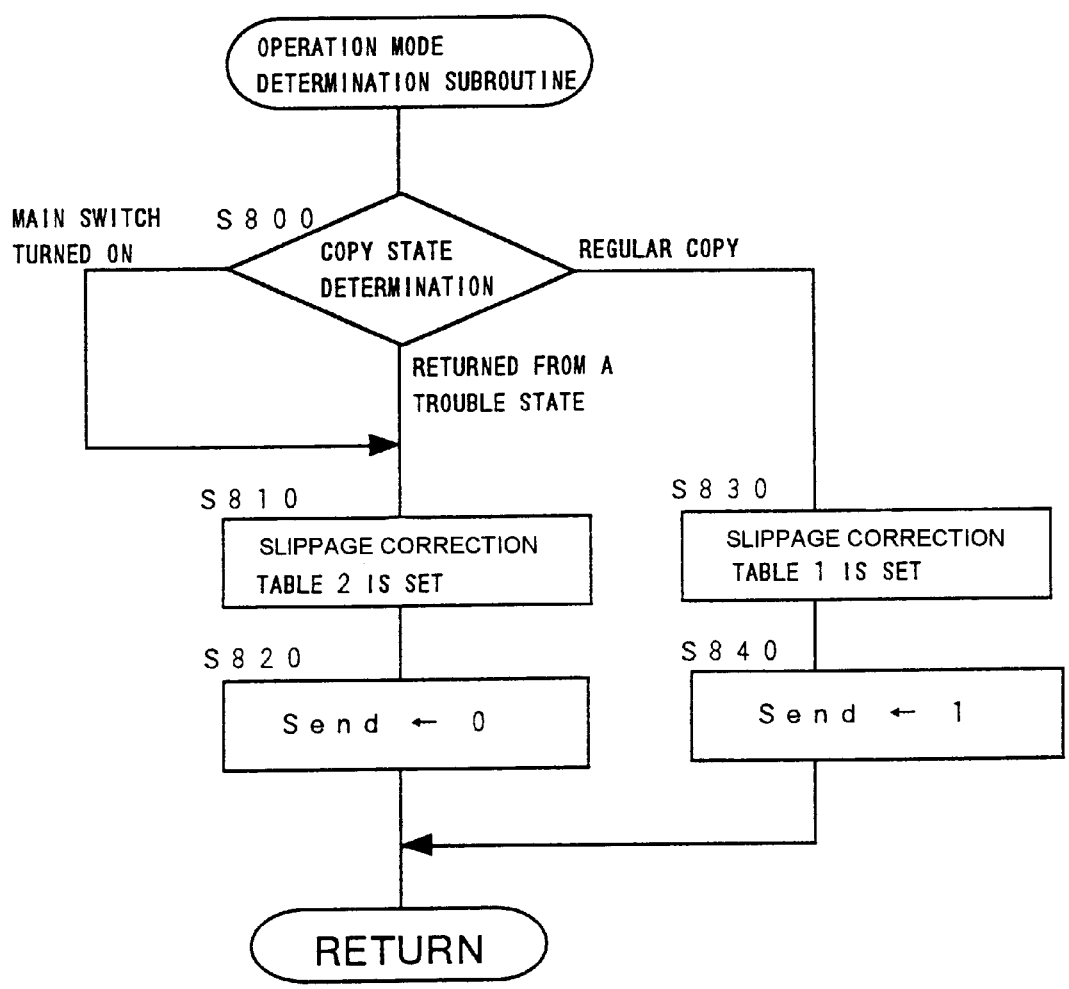
FIG. 16 is an operation mode determination subroutine of the other example of the belt slippage correcting operation.

FIG. 16 shows the sequence of the operation mode determination subroutine

When the process enters the operation mode determination subroutine the copy state is determined in step S800. This copy state is a flag raised to identify the copy operation mode when the main switch is turned ON or when the device has returned from a trouble state such as jamming or maintenance in the progress of the control program shown in the operation control flow chart of FIG. 9.

Where it is determined in step S800 that the copy state is 'main switch turned ON', the process advances to step S810 and the slippage correction table 2 is set as the slippage correction control table used in step S350 of the stepping motor drive subroutine Table 3 shows an example of slippage correction table 2.

TABLE 3

Slippage correction table 2

|  |  | Current determination level | | | | |
|---|---|---|---|---|---|---|
|  |  | HH | H | M | L | LL |
| Previous | HH | −6 | 0 | C | C | C |
| determination | H | −6 | −3 | C | C | +6 |
| level | M | −6 | −1 | 0 | +1 | +6 |
|  | L | −6 | C | C | +3 | +6 |
|  | LL | C | C | C | 0 | +1 |

This slippage correction table 2 is different from the slippage correction table 1 explained above only regarding the underlined numbers. Specifically, the number of steps by which to drive the stepping motor is set to be large when (i) the previous determination level is H and the current determination level is H or HH, (ii) the previous determination level is HH and the current determination level is HH, (iii) the previous determination level is L and the current determination level is L or LL, or (iv) the previous determination level is LL and the current determination level is LL. Through this setting even where the intermediate transfer belt 20 has shifted laterally to a large extent while image forming device 100 is not running positional correction can be speedily performed during preliminary running. In such a case, since no images are formed on intermediate transfer belt 20, sudden lateral movement does not give rise to any defective images.

Next, in step S820, flag Send is set to 0 in order to indicate that rough adjustment is being made to the provisional stable position of first transfer pre-roller 27, after which the process returns to the routine of the slippage correcting operation flow chart.

Where it is determined in step S800 that the copy state is 'returned from a trouble state', the process also advances to step S810 in which the slippage correction table 2 is set as the slippage correction table. After setting flag Send to 0 in step S820, the process returns to the routine of the slippage correcting operation flow chart.

Where it is determined in step S800 that the copy state is 'regular copy', the process advances to step S830 in which the slippage correction table 1 is set as the slippage correction table. After setting flag Send to 1 to indicate that the provisional stable position of first transfer pre-roller 27 has been found, the process returns to the routine of the slippage correcting operation flow chart.

When the process returns from the operation mode determination subroutine shown in FIG. 16 in this way, steps S620 through S690 are executed. Since the details of steps S620 through S690 are the same as those of steps S220 through S290 of the slippage correcting operation flow chart of FIG. 11, their explanations are omitted here. The sequence of the stepping motor drive subroutine of step S690 is the same as the sequence of the stepping motor drive subroutine of step S290 in FIG. 12 except that either slippage correction table 1 or slippage correction table 2 selected in the operation mode determination subroutine is used for the slippage correction table used in step S350.

When the steps up to step S690 are carried out, the provisional stable position correction subroutine of step S700 is executed.

Figure 17:
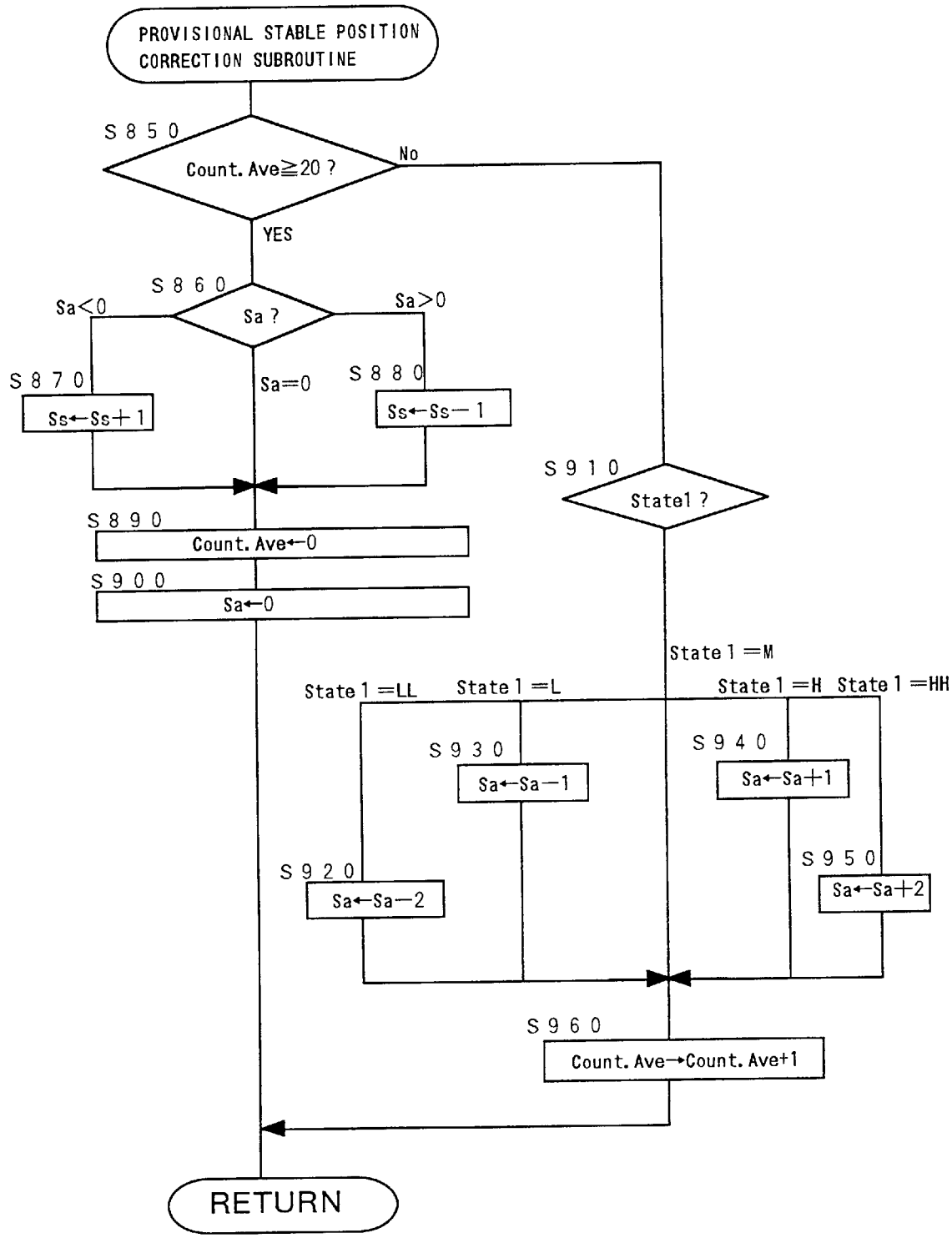
FIG. 17 shows another example of the provisional stable position correction subroutine of the belt slippage correcting operation.

FIG. 17 shows another example of the provisional stable position correction subroutine. The provisional stable position correction subroutine shown in FIG. 17 is a method to calculate the provisional stable position by obtaining the average of two or more measurement values. By using this method, increased precision can be achieved. When the process enters the provisional stable position correction subroutine, determination as to the counter Count.Ave is carried out in step S850. When this counter value reaches 20, the process advances to the routine to correct the provisional stable position (steps S860 through S900). Otherwise, the process advances to the routine to change average level variable Sa (steps S910 through S960) in accordance with the current determination level (State1).

Where it is determined in step S850 that the counter value is less than 20, the process advances to step S910 and then takes different routes in accordance with variable State1 that indicates the current determination level.

Where State1 is M, no correction is made to variable Sa and the process advances to step S960 without any operation being performed.

Where State1 is LL, average level variable Sa is reduced by 2 in step S920 and the process advances to step S960.

Where State1 is L, average level variable Sa is reduced by 1 in step S930 and the process advances to step S960.

Where State1 is H, average level variable Sa is increased by 1 in step S940 and the process advances to step S960.

Where State1 is HH, average level variable Sa is increased by 2 in step S950 and the process advances to step S960.

In step S960, the value of counter Count.Ave is increased by 1 and the process returns to the routine of the slippage correcting operation flow chart.

Next, where it is determined in step S850 that the counter Count.Ave count value has reached 20, the process advances to step S860. In step S860, it is determined whether average level variable Sa changed in accordance with State1 (determination level) before the value of counter Count.Ave reached 20 is positive or negative.

Where variable Sa is 0, State1 (determination level) is output with an equal positive/negative distribution during the twenty measurements, and therefore the provisional stable position is determined to be correct, whereupon the process advances to step S890 without correcting variable Ss that indicates the provisional stable position.

Where variable Sa is negative in step S860, it is determined that the average determination level of the twenty measurements inclined to the negative side, whereupon variable Ss that indicates the provisional stable position is increased by 1 and the process advances to step S890.

Where variable Sa is positive in step S860, it is determined that the average determination level of the twenty measurements inclined to the positive side, whereupon variable Ss that indicates the provisional stable position is reduced by 1 and the process advances to step S890.

After correction is made to variable Sc in accordance with the value of variable Sa, 0 is substituted for the value of counter Count.Ave and variable Sa in steps S890 and S900, respectively, and the process returns to the routine of the slippage correcting operation flow chart.

If correction is made to the provisional stable position based on an average value of two or more measurements, more stable control can be carried out. While the number of measurements is set at twenty in this embodiment, said number is not limited to this. Any other approximate number of measurements may be set.

When the provisional stable position correction subroutine is completed and the process returns to the routine of the slippage correcting operation flow chart, the rough adjustment completion determination subroutine is then executed The provisional stable position correction subroutine of FIG. 13 may be used in this control example, and the provisional stable position correction subroutine of FIG. 17 may be used in the first control example.

Figure 18:
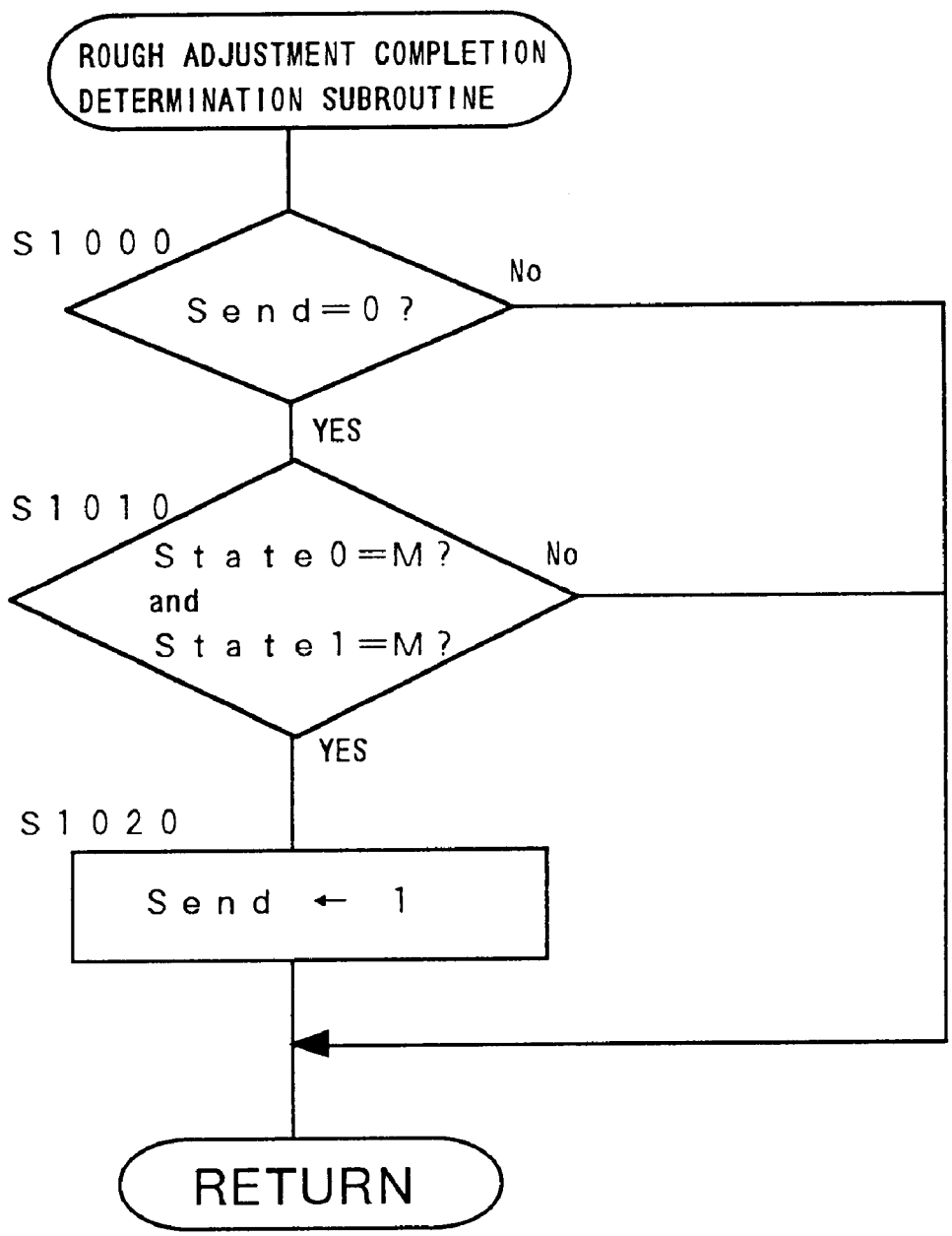
FIG. 18 is a rough adjustment completion determination subroutine of the other example of belt slippage correcting operation.

FIG. 18 shows the sequence of the rough adjustment completion determination subroutine.

When the rough adjustment determination subroutine is called in step S710 of the slippage correcting operation flow chart shown in FIG. 15, the process advances to step S1000 in which it is determined whether the provisional stable position of first transfer pre-roller 27 is being sought based on the content of flag Send set in the operation mode determination subroutine of FIG. 16.

In other words, where flag Send is not 0, or where the provisional stable position has been found, the process returns to the routine of the slippage correcting operation flow chart without any further operation being performed.

If flag Send is found to be 0 in step S1000, or in other words, where the provisional stable position is being sought, the process advances to step S1010. It is determined in step S1010 whether or not the lateral movement of intermediate transfer belt 20 is stable. In this embodiment, due to the design of the slippage correction table, if the lateral position of intermediate transfer belt 20 is at target level M twice in a row, it can be determined that the lateral position of intermediate transfer belt 20 is stable at target position M and first transfer pre-roller 27 is at the provisional stable position. Therefore, if State0 is M and State1 is M, it is determined that the provisional stable position of first transfer pre-roller 27 has been found and the process advances to step S1020. It is also acceptable for the process to advance to step S1020 after the lapse of a prescribed period of time or after intermediate transfer belt 20 has rotated a prescribed number of times. In step S1020, flag Send is set to 1 and the process returns to the routine of the slippage correcting operation flow chart.

If the result of the determination in step S1010 is NO, the process returns to the routine of the slippage correcting operation flow chart.

When the rough adjustment completion determination subroutine is completed, the value of current determination level variable State1 is substituted for previous determination level variable State0 in step S720 and the process waits for the timing signal of second position detection sensor 41 to turn OFF in step S730. When it turns OFF, the process returns to step S620.

By using this control example, the belt can be returned to a stable state when the main switch of the image forming device is turned ON and when the running of the belt is resumed after jamming and other problems are resolved, as a result of which more stable images can be obtained.

Correction in the direction of shifting of the slippage correcting roller will now be explained. In the present invention, as shown in FIG. 2, correction regarding the slippage of the belt is performed by shifting the position of first transfer pre-roller 27, which is one of the rollers over which intermediate transfer belt 20 is suspended, thereby having it function as a slippage correcting roller. Where the rollers over which intermediate transfer belt 20 is suspended are exactly parallel, the lateral movement characteristics when the belt slippage correcting roller corrects the position of intermediate transfer belt 20 are identical regardless of the direction in which the slippage correcting roller is shifted. However, it is difficult in actual practice to align the rollers over which intermediate transfer belt 20 is suspended so as to be exactly parallel to one another. Where the suspension rollers are not exactly parallel to one another, each suspension roller generates a force that shifts the belt in the direction corresponding to the tilting of the roller and causes the belt to move laterally in one direction. The slippage correcting roller is shifted to the provisional stable position in order to prevent this lateral movement, but because the roller system itself has a characteristic to shift the belt in one direction, the amount of lateral movement changes depending on the direction of shift of the slippage correcting roller.

Figure 19:
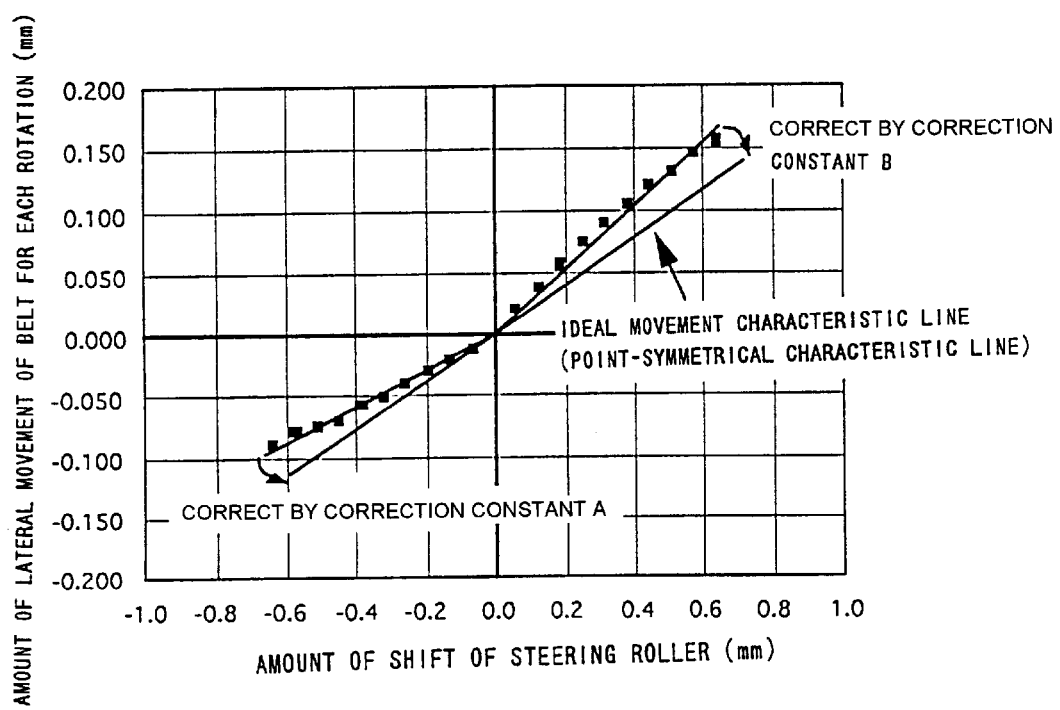
FIG. 19 is a graph showing the amount of lateral movement per rotation of the belt as the degree of tilt of the steering roller is changed.

FIG. 19 is a graph showing the result of measuring the amount of lateral movement of the belt for each rotation when the amount of shift (amount of tilt) of the steering roller for slippage correction (first transfer pre-roller 27 in this embodiment) is changed, using intermediate transfer belt 20 in the embodiment shown in FIG. 2. In the graph shown in FIG. 19, the horizontal axis indicates the amount of shift (amount of tilt) of the steering roller, while the vertical axis indicates the amount of lateral movement for each rotation of the belt. As can be seen from this graph, while an ideal movement characteristic line is point-symmetrical with respect to the amount of shift of the steering rollers the actual lateral movement tends to occur with an inclination toward one direction. If slippage correction is performed with the slippage correcting mechanism in this condition, the lateral movement of the belt changes depending on the direction in which the steering roller is shifted. Further, there are cases where overshoot occurs, even where the motor is driven by a small number of steps, when the steering roller is shifted in the direction in which slippage tends to be greater, as well as cases where the belt is not sufficiently moved to the target position, even where the roller is shifted by the prescribed number of steps, when the steering roller is shifted in the direction in which slippage tends to be less. This phenomenon can be prevented by driving the motor using the number of drive steps corrected into the ideal movement characteristic, by multiplying correction constant A or B set in accordance with the direction of shift of the steering roller by the value read from the slippage correction table, as shown in the graph of FIG. 19.

Figure 20:
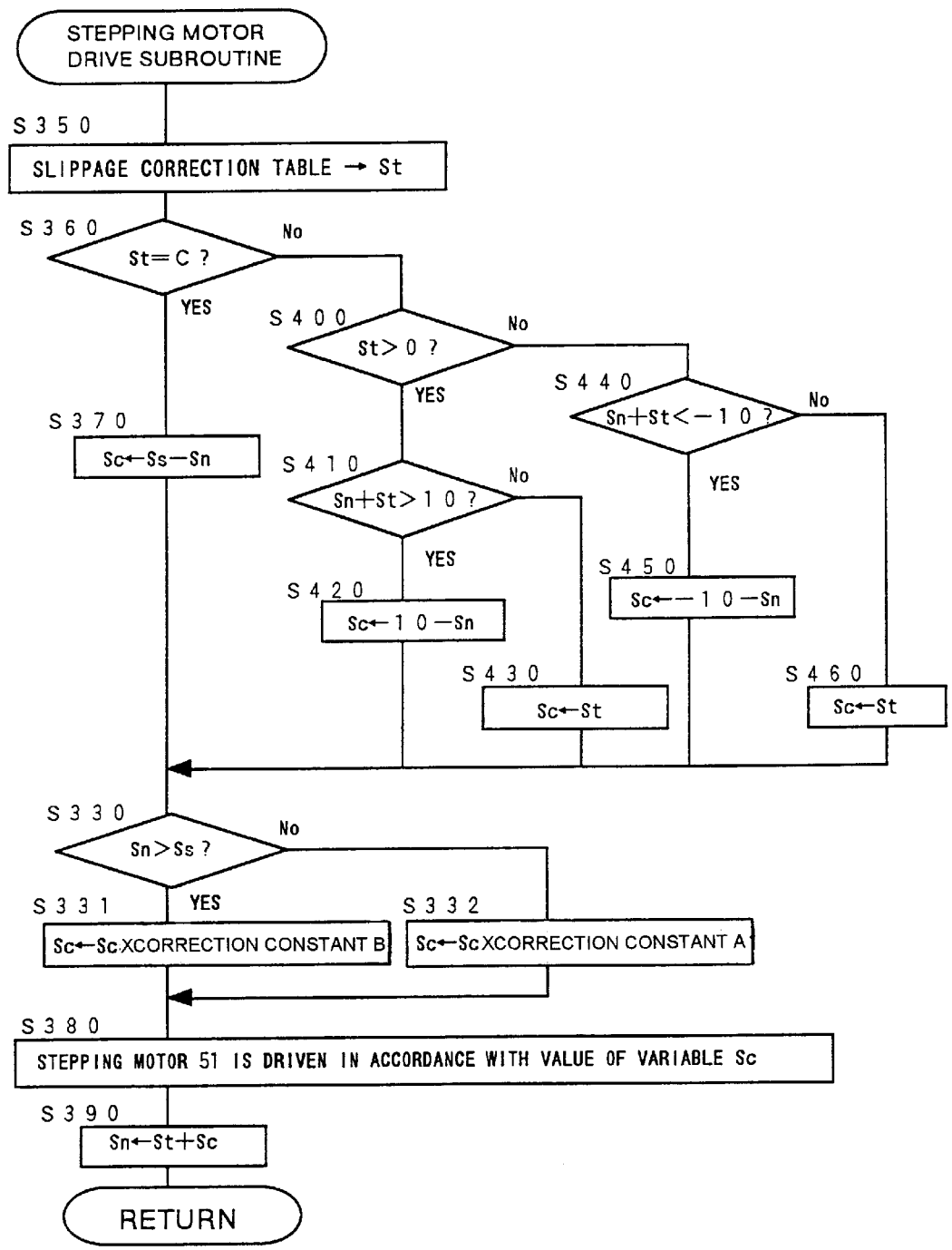
FIG. 20 is a stepping motor drive subroutine of the belt slippage correcting operation.

FIG. 20 is a flow chart used in the case where correction as described above is carried out. The flow chart of FIG. 20 is a modification of the stepping motor drive subroutine shown in FIG. 12. Therefore, an explanation will be given focusing on differences from the subroutine of FIG. 12 and explanations as to processes common to both subroutines are omitted.

In FIG. 20 the value of variable Sc (the number of steps by which to drive the stepping motor) is corrected before the stepping motor is driven in accordance with the value of variable Sc in step S380. In other words, it is determined in step S330 whether the position of first transfer pre-roller 27 is on the plus side or the minus side relative to the provisional stable position, or namely, whether or not the value of variable Sn (the current step position of the stepping motor) is larger than variable Ss (the provisional stable position). Where it is larger, the process advances to step S331 in which variable Sc is multiplied by correction constant B, and where it is not larger, the process advances to step S332 in which variable Sc is multiplied by correction constant A. Correction constants A and B are values obtained experimentally The actual movement characteristic can be corrected to the ideal movement characteristic by multiplying variable Sc by one of said values, as shown in the graph of FIG. 19.

Figure 21:
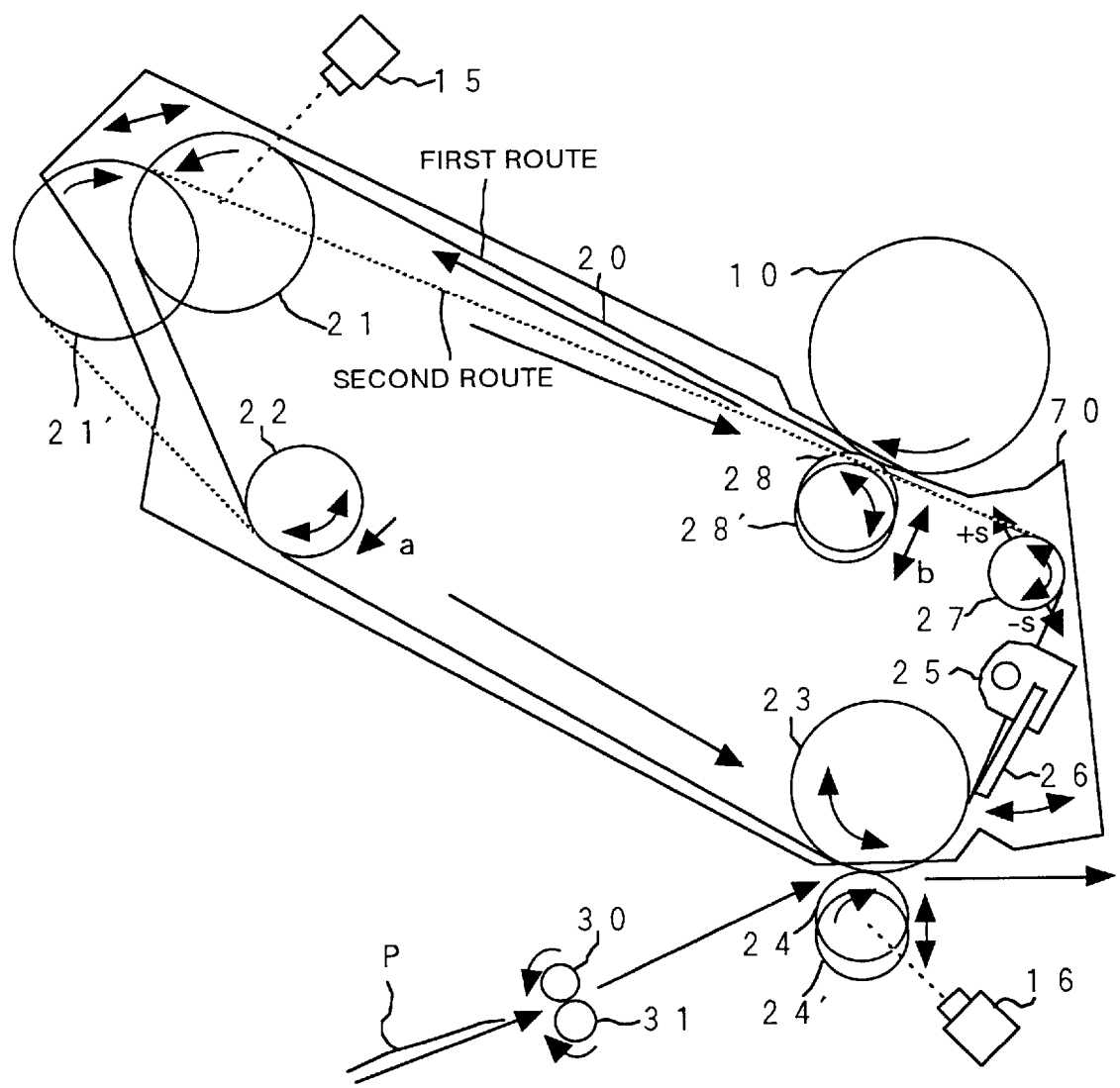
FIG. 21 is a cross-sectional view showing the construction of the intermediate transfer unit when the intermediate transfer belt makes and loses contact with a photosensitive member.

Further, intermediate transfer belt 20 may be moved away from photosensitive member 10 and run in order to achieve positioning faster when no images are being formed. FIG. 21 is a cross-sectional view showing the construction of intermediate transfer unit 2 in the case where intermediate transfer belt 20 is moved away from photosensitive member 10.

Intermediate transfer belt 20 is suspended in the condition shown as the first route during a regular image forming process. It is pressed onto photosensitive member 10 by first transfer roller 28. Drive roller 21 and first transfer roller 28 can be moved to positions 21' and 28', respectively. When drive roller 21 and first transfer roller 28 move to positions 21' and 28' respectively intermediate transfer belt 20 is suspended in the condition shown as the second route and is no longer pressed onto photosensitive member 10. If second transfer roller 24 is moved to position 24' and the pressing of cleaning blade 26 is eliminated in this condition, intermediate transfer belt 20 comes into a condition in which it may be conveyed backward. Since nothing is externally pressing against intermediate transfer belt 20, intermediate transfer belt 20 may be moved at high speed both during forward and backward conveyance Therefore, positioning of the belt can be performed quickly.

Figure 22:
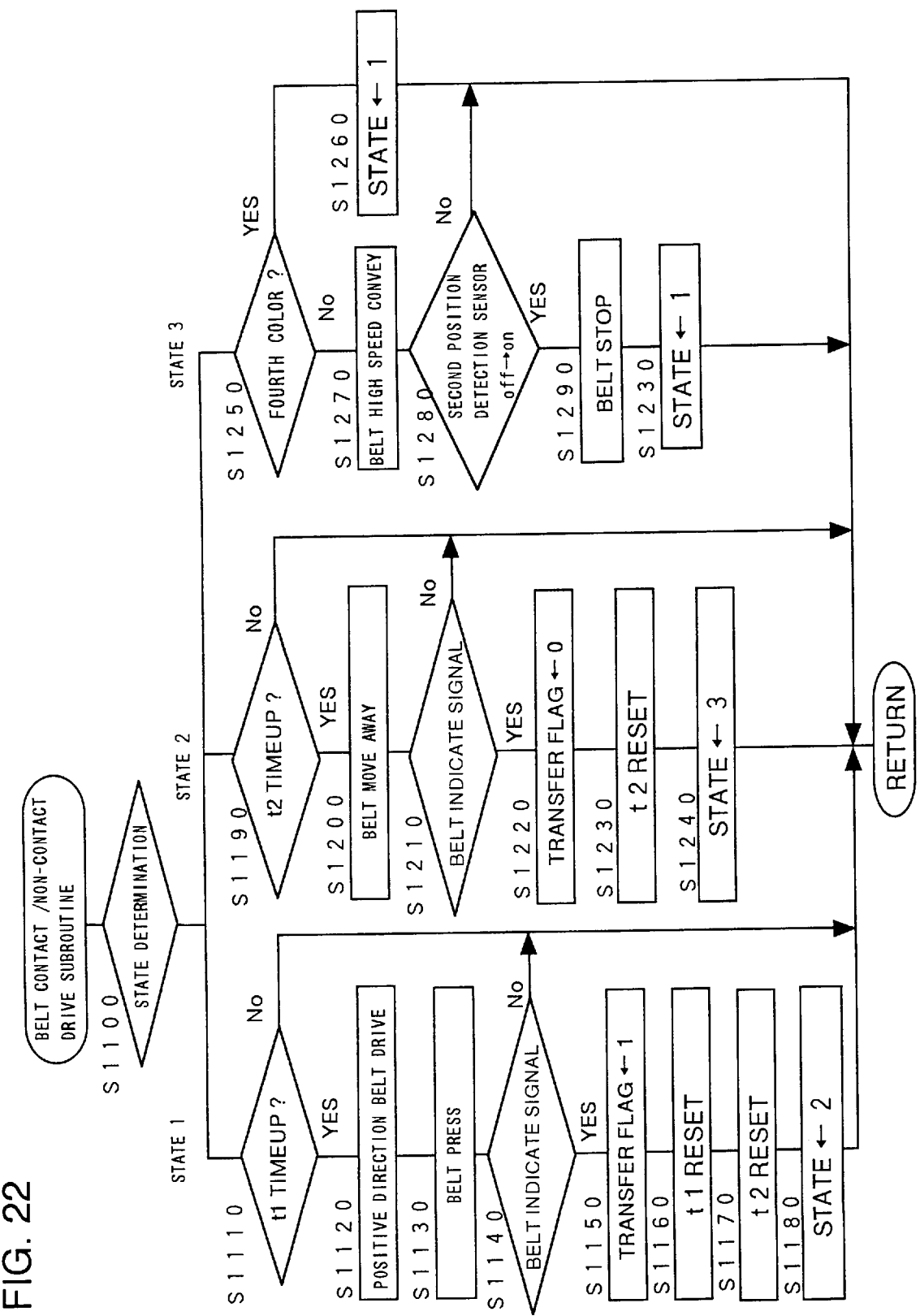
FIG. 22 is a printing operation subroutine of the operation control flow chart.

FIG. 22 shows a subroutine to drive intermediate transfer belt 20 with or without said belt being in contact with the outside rollers. This subroutine is included in step S110 of the printing operation subroutine shown in FIG. 10 In this subroutine, intermediate transfer belt 20 makes or loses contact with photosensitive member 10 and is driven in tandem with the image forming operation.

The belt contact/non-contact drive subroutine described above will now be explained with reference to FIG. 22. When the process enters the belt contact/non-contact drive subroutine in step S110, state determination takes place in step S1100. Since the state is 1 in the initialization setting, the process advances to step S1110.

It is then determined in step S1110 whether or not time period t1 to time the belt drive has elapsed. If it is determined in step S1110 that time period t1 has elapsed, the process advances to step S1120. If time period t1 has not elapsed, the process returns to the main routine. The counting of timer value t1 begins when the start of the transfer operation is set in the main routine Next, in step S1120 intermediate transfer belt 20 is driven in the positive direction, and in step S1130, drive roller 21 and first transfer roller 28 are moved such that intermediate transfer belt 20 may be pressed onto photosensitive member 10.

Where a signal that indicates that intermediate transfer belt 20 has become pressed onto photosensitive member 10 is detected in step S1140, the process advances to step S1150O In step S1150, a transfer flag is set to 1. This flag indicates that intermediate transfer belt 20 is at a position where image transfer is possible.

In step S1160, timer value t1 is reset.

In step S1170, timer value t2 is set and counting starts. The value of timer value t2 is equal to the time period in which a transfer operation is performed.

In step S1180 the state flag is set to 2.

Where it is determined in step S1100 that the state flag is 2, the process advances to step S1190.

It is determined in step S1190 whether or not time period t2 equal to the time period in which a transfer operation is performed has elapsed. If it is determined in step S1190 that time period t2 has elapsed, the process advances to step S1200 and where time period t2 has not elapsed the process returns to the main routine.

Next, in step S1200 drive roller 21 and first transfer roller 28 are moved such that intermediate transfer belt 20 is moved away from photosensitive member 10.

When a signal indicating that intermediate transfer belt 20 has been moved away from photosensitive member 10 is detected in step S1210, the process advances to step S1220. In step S1220, the transfer flag is set to 0. This flag indicates that intermediate transfer belt 20 is at a position where it is not in contact with photosensitive member 10.

In step S1230, timer value t2 is reset.

In step S1240, the state flag is set to 3.

Where it is determined in step S1100 that the state flag is set to 3 the process advances to step S1250.

It is determined in step S1250 whether image formation has been completed up to the fourth color. Where it is determined in step S1250 that image formation has been completed up to the fourth color, the process advances to step S1260 in which the state flag is set to 1 and the process returns to the main routine.

Where it is determined in step S1250 that image formation has not been completed up to the fourth color, the process advances to step S1270 in which intermediate transfer belt 20 is conveyed at a high speed. When second position detection sensor 41 detects timing mark M on intermediate transfer belt 20 in step S1280, the drive of intermediate transfer belt 20 is stopped in step S1290. Finally, in step S1240, the state flag is set to 3, and the process returns to the main routine.

As the conveyance route of intermediate transfer belt 20 changes as it makes or loses contact with photosensitive member 10, the positional relationship among rollers over which intermediate transfer belt 20 is suspended change. Therefore, it is necessary to change the provisional stable position of first transfer pre-roller 27 in response to the conveyance route.

Figure 23:
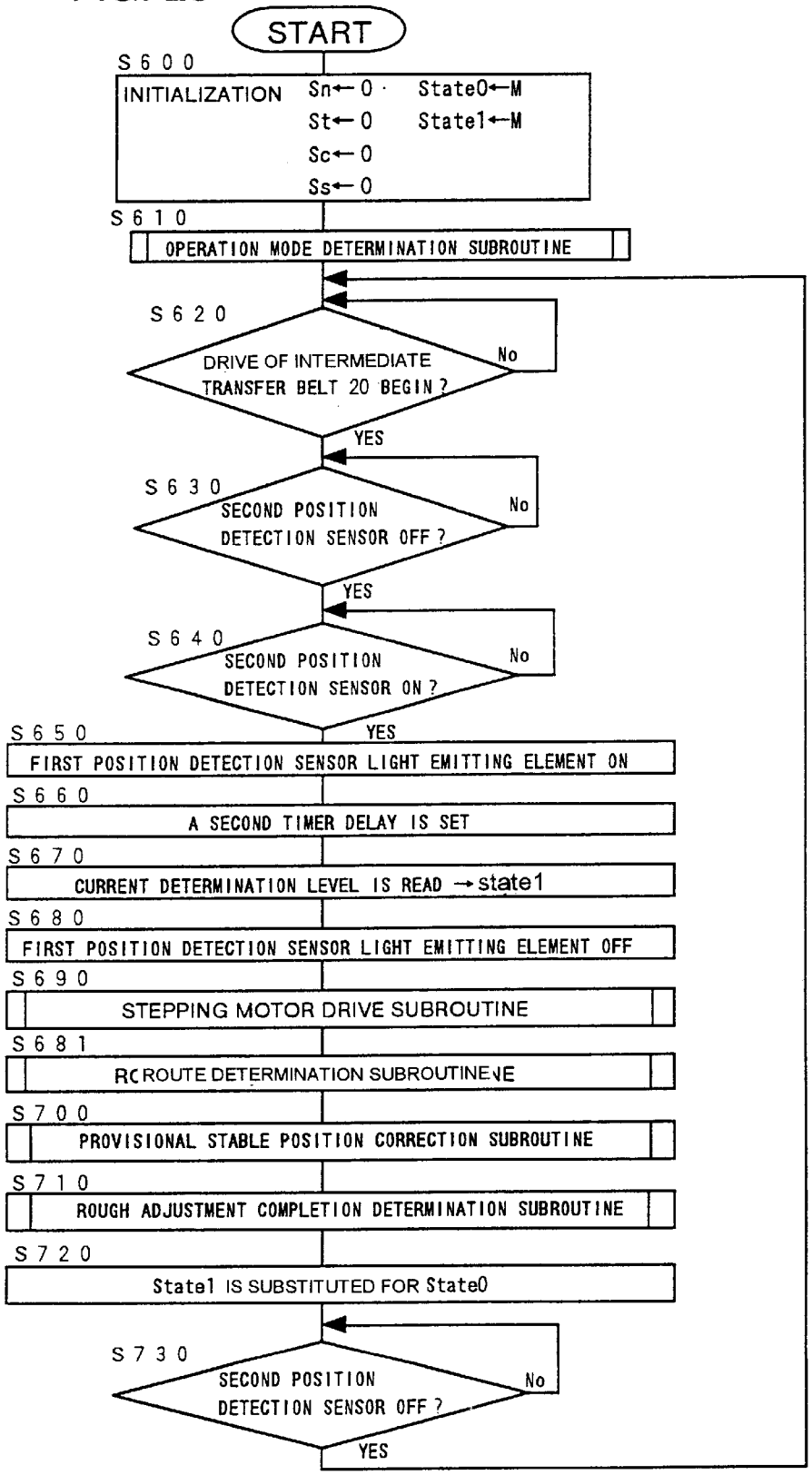
FIG. 23 is a belt slippage correcting operation flow chart when the route of the intermediate transfer belt is changed.

FIG. 23 is a belt slippage correcting operation flow chart applicable when the route of intermediate transfer belt 20 is changed.

The sequence of this flow chart is partially different from that of the slippage correcting operation flow chart shown in FIG. 15, and is used in place of the latter sequence. Therefore, only differences from the sequence of the slippage correcting operation flow chart of FIG. 15 will be explained here.

The sequence of FIG. 23 is different from that of the slippage correcting operation flow chart of FIG. 15 only in that the route determination subroutine of step S681 is added.

After the output of light emitting element 40a of first position detection sensor 40 is turned OFF in step S680, the conveyance route determination subroutine to determine the conveyance route of intermediate transfer belt 20 and correct the provisional stable position is executed in step S681. The stepping motor drive subroutine of step S690 is then executed.

Figure 24:
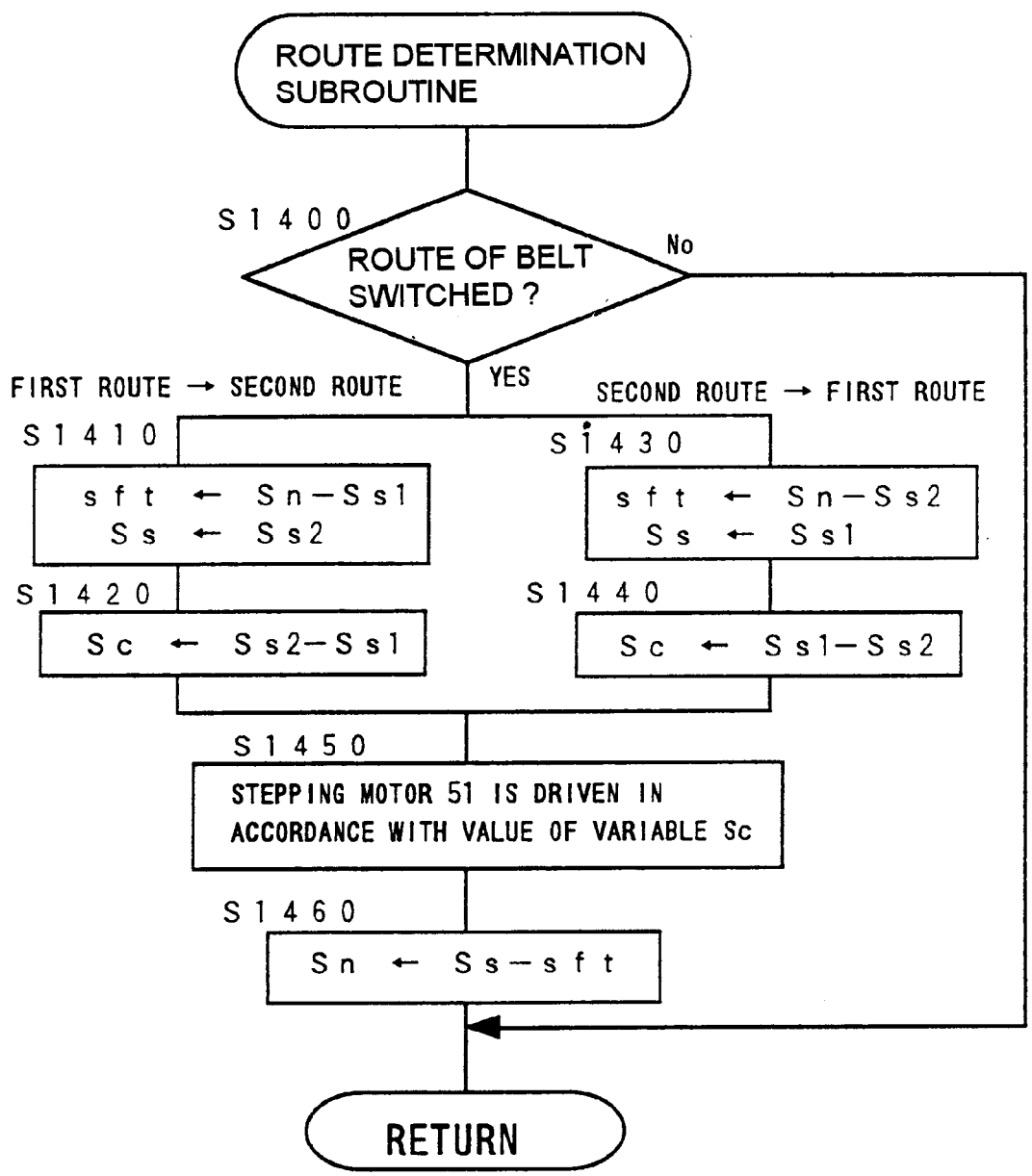
FIG. 24 is a flow chart showing the sequence of the route determination subroutine.

FIG. 24 shows the sequence of the route determination subroutine.

It is confirmed in step S1400 whether the conveyance route of intermediate transfer belt 20 has been switched. Where it has not been switched, the process returns to the main routine without any further operation being performed.

Where it is confirmed in step S1400 that the conveyance route of intermediate transfer belt 20 has been switched and the switching has been from the first route to the second route, the process advances to step S1410.

In step S1410, provisional stable position variable Ss1 in the first route is subtracted from variable Sn (the current step position of the stepping motor), and the value resulting from the subtraction is substituted for variable Sft (the amount of shift) In this way, the degree to which variable Sn (the current step position of the stepping motor) has shifted relative to variable Ss1 (the provisional stable position in the first route) is determined. Provisional stable position variable Ss2 in the second route is then substituted for provisional stable position variable Ss to change provisional stable position data.

In step S1420, the number of steps that is needed to make correction to the provisional stable position as the route is switched from the first route to the second route is obtained. In step S1420, a value obtained by subtracting variable Ss1 (the provisional stable position in the first route) from variable Ss2 (the provisional stable position in the second route) is substituted for variable Sc (the number of steps by which to drive the stepping motor), and the process advances to step S1450.

Where it is confirmed in step S1400 that the conveyance route of intermediate transfer belt 20 has been switched and the switching has been from the second route to the first route, the process advances to step S1430.

In step S1430, provisional stable position variable Ss2 in the second route is subtracted from variable Sn (the current step position of the stepping motor), and the value resulting from the subtraction is substituted for variable Sft (the amount of shift) In this way, the degree to which variable Sn (the current step position of the stepping motor) has shifted relative to variable Ss2 (the provisional stable position in the second route) is determined. Provisional stable position variable Ss1 in the first route is then substituted for provisional stable position variable Ss to change provisional stable position data.

In step S1440, the number of steps that is needed to make correction to the provisional stable position as the route is switched from the second route to the first route is obtained. In step S1440, a value obtained by subtracting variable Ss2 (the provisional stable position in the second route) from variable Ss1 (the provisional stable position in the first route) is substituted for variable Sc (the number of steps by which to drive the stepping motor) and the process advances to step S1450.

In step S1450, stepping motor 51 is driven in accordance with the value of variable Sc (the number of steps by which to drive the stepping motor) obtained in step S1420 or step S1440.

In step S1460, a value obtained by subtracting variable Sft (the amount of shift) from variable Ss (the provisional stable position) is substituted for variable Sn (the current step position of the stepping motor), and the process returns to the main routine.

By carrying out correction as described above, stable slippage correction can take place even if the conveyance route is changed.

Figure 25:
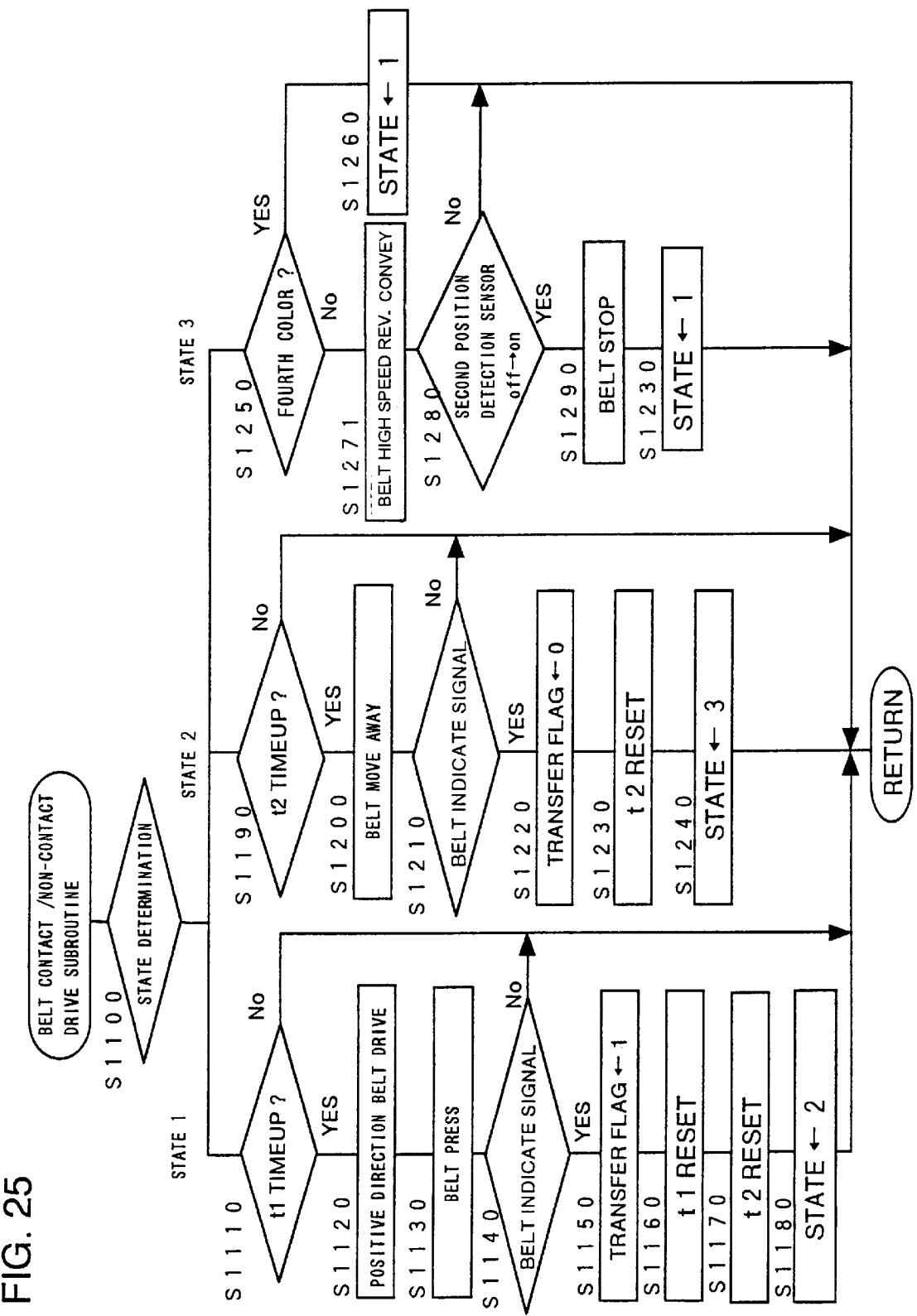
FIG. 25 is a belt contact/non-contact drive subroutine showing another example of control when the intermediate transfer belt makes and loses contact with the photosensitive member.

FIG. 25 is a belt contact/non-contact drive subroutine showing another example of control when intermediate transfer belt 20 makes or loses contact with photosensitive member 10 and is driven in one of said two contact conditions. The belt contact/non-contact drive subroutine of FIG. 25 is different from the belt contact/non-contact drive subroutine shown in FIG. 22 only in regard to step S1271. Due to step S1271, when intermediate transfer belt 20 moves out of contact with photosensitive member 10, the direction of conveyance is reversed and said belt is conveyed at a high speed.

Where intermediate transfer belt 20 is conveyed backward in this way, if it is conveyed backward with first transfer pre-roller 27 tilted by angle θ in order to return intermediate transfer belt 20, which has come off the target position, to said target position, intermediate transfer belt 20 laterally moves in the direction opposite to the direction of its lateral movement during forward conveyance. Therefore, during backward conveyance of intermediate transfer belt 20, it is necessary to carry out a correcting operation different from that used during forward conveyance. For the correcting operation during backward conveyance of intermediate transfer belt 20, a method to tilt first transfer pre-roller 27 in the direction opposite to the direction of tilt used during forward conveyance is possible.

Figure 26:
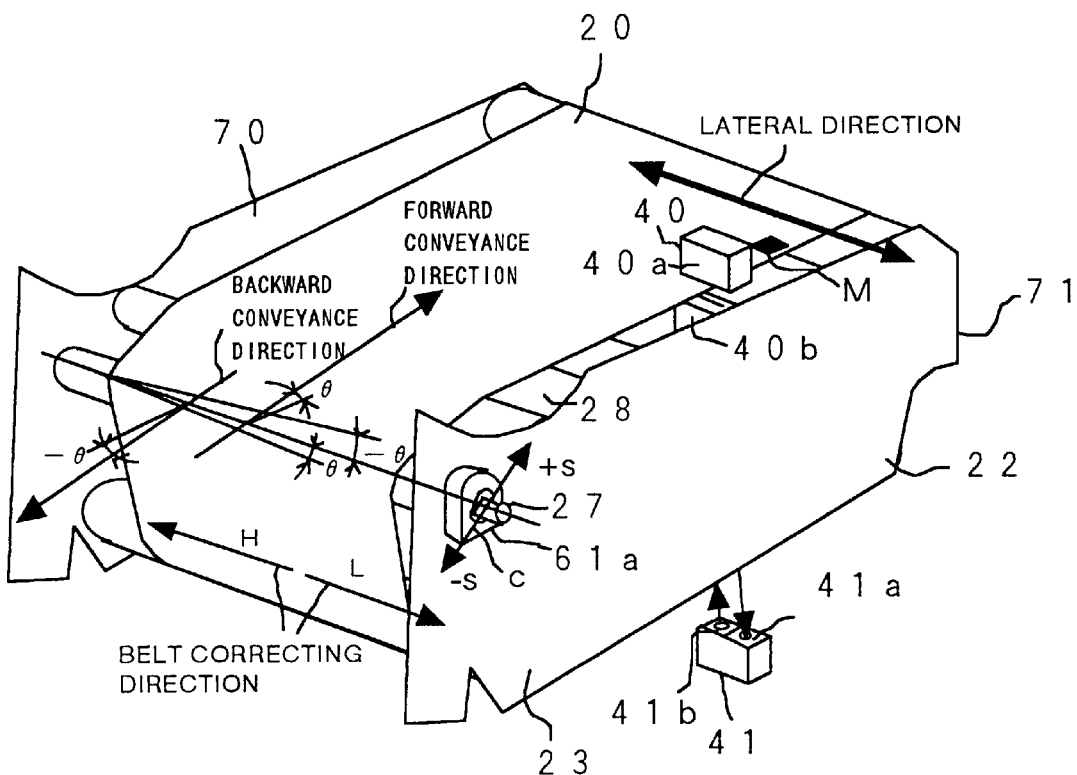
FIG. 26 is a perspective view of the intermediate transfer unit.

FIG. 26 is a perspective view of the intermediate transfer unit. As shown in FIG. 26, if first transfer pre-roller 27 is tilted by angle –θ, during backward conveyance of intermediate transfer belt 20, the same correction that is performed when said roller is tilted by angle 0 during forward conveyance can be carried out.

It is also necessary to change the slippage correction table because during backward conveyance of intermediate transfer belt 20 the direction of shifting of first transfer pre-roller 27 and the direction of lateral movement of intermediate transfer belt 20 are reversed as compared to forward conveyance. Table 4 shows a slippage correction table 3 that is used during backward conveyance The plus and minus symbols of the values in the slippage correction table 3 are reversed from the slippage correction table 1 shown in Table 2 which is used during forward conveyance.

TABLE 4

Slippage correction table 3

| | | Current determination level | | | | |
| --- | --- | --- | --- | --- | --- | --- |
| | | HH | H | M | L | LL |
| Previous | HH | +1 | 0 | C | C | C |
| determination | H | +2 | +1 | C | C | –6 |
| level | M | +6 | +1 | 0 | –1 | –6 |
| | L | +6 | C | C | –1 | –2 |
| | LL | C | C | C | 0 | –1 |

In this slippage correction table 3, the number of steps for shifting are the same as in the slippage correction table 1 explained above, but the direction of shifting is reversed.

Figure 27:
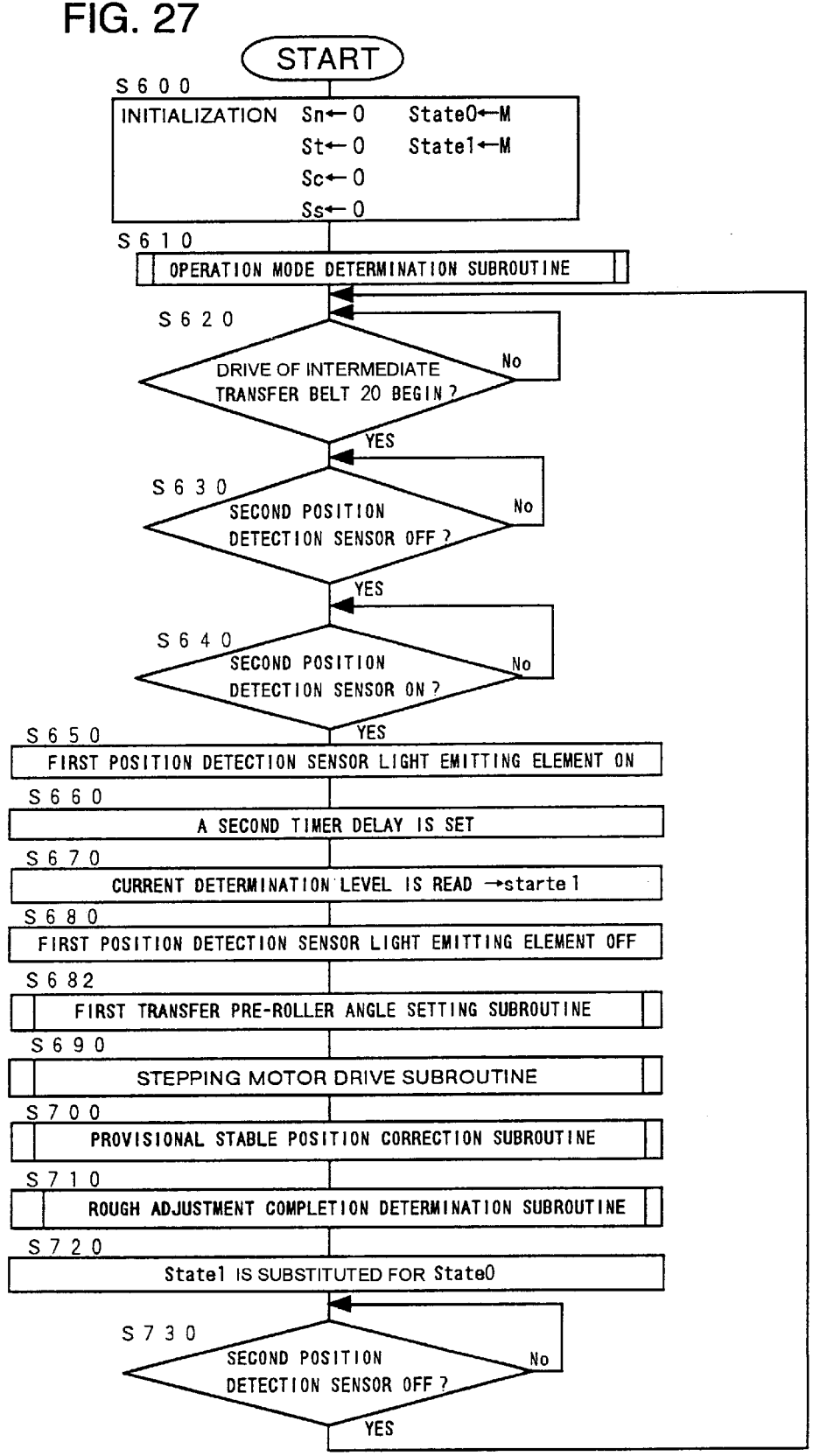
FIG. 27 is a belt slippage correcting operation flow chart when the intermediate transfer belt is conveyed forward and backward.

FIG. 27 is a belt slippage correcting operation flow chart used when intermediate transfer belt 20 is conveyed forward and backward.

The sequence of this flow chart is partially different from the sequence of the slippage correcting operation flow chart shown in FIG. 15, and is used instead of the latter sequence. Therefore, only differences from the sequence of the slippage correcting operation flow chart of FIG. 15 will be explained here.

The sequence of the flow chart shown in FIG. 27 is different from the sequence of the slippage correcting operation flow chart of FIG. 15 in that a first transfer pre-roller angle setting subroutine of step S682 is added and the sequence of the stepping motor drive subroutine of step S690 is different.

After the output of light emitting element 40a of first position detection sensor 40 is turned OFF in step S680, the direction of conveyance of intermediate transfer belt 20 is determined in step S682. The first transfer pre-roller angle setting subroutine to change the tilt angle of first transfer pre-roller 27 is then executed, after which the stepping motor drive subroutine of step S690 is carried out.

Figure 28:
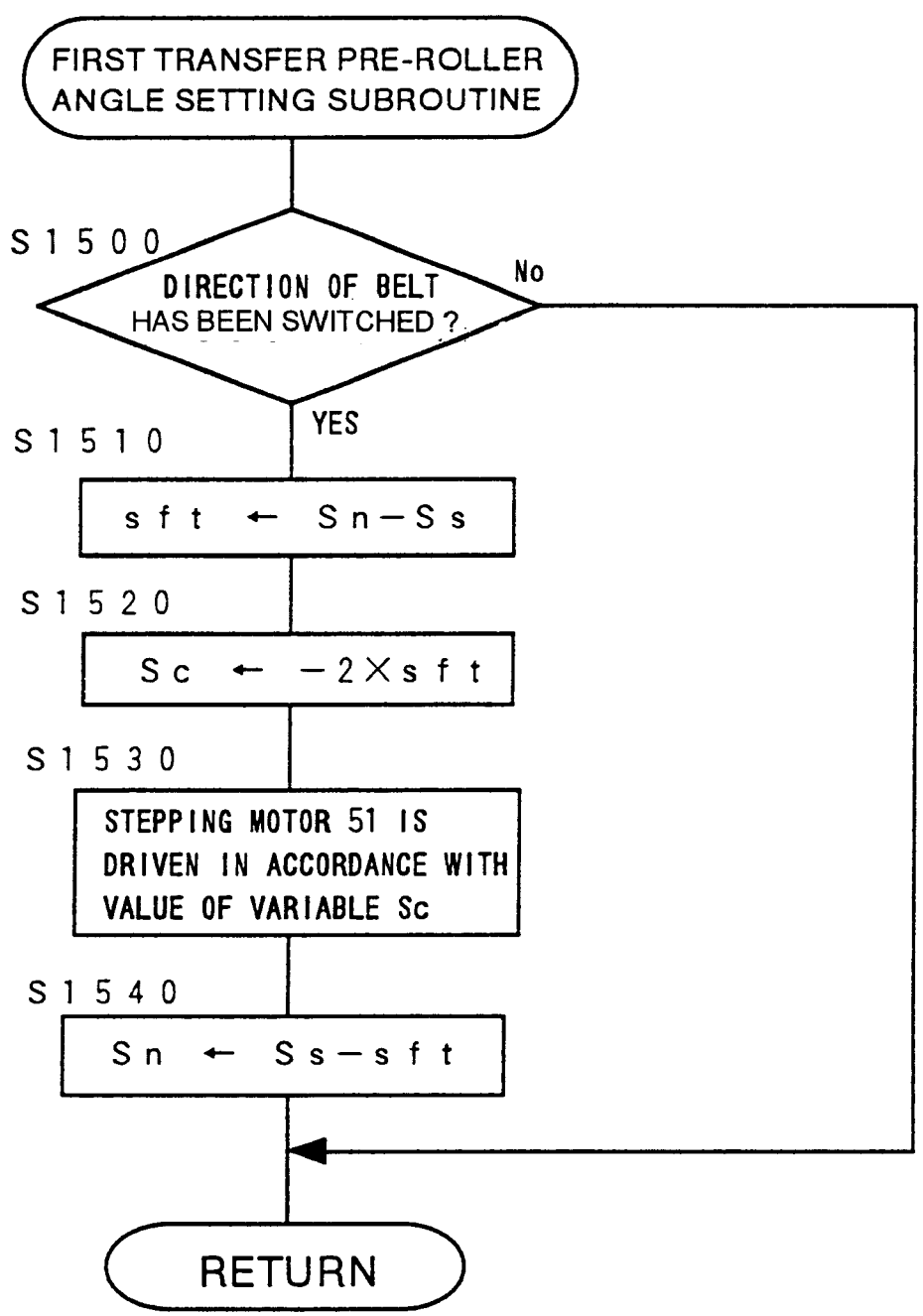
FIG. 28 is a flow chart showing the sequence of the first transfer pre-roller angle setting subroutine.

FIG. 28 shows the sequence of the first transfer pre-roller angle setting subroutine.

It is confirmed in step S1500 whether or not the direction of rotation of intermediate transfer belt 20 has been switched. Where it has not been switched the process returns to the main routine.

Where it is confirmed in step S1500 that the direction of rotation of intermediate transfer belt 20 has been switched, the process advances to step S1510.

In step S1510, variable Ss (the provisional stable position) is subtracted from variable Sn (the current step position of the stepping motor), and the value resulting from the subtraction is substituted for variable Sft (the amount of shift). By this, the degree to which variable Sn (the current step position of the stepping motor) has shifted relative to variable Ss (the provisional stable position) is determined.

In step S1520, a value obtained by multiplying the value of variable Sft by −2 is substituted for variable Sc (the number of steps by which to drive the stepping motor). In this step, the number of steps needed to shift first transfer pre-roller 27 by the target angle relative to variable Ss (the provisional stable position) is obtained.

In step S1530, stepping motor 51 is driven in accordance with the value of variable Sc (the number of steps by which to drive the stepping motor) obtained in step 51520.

In step S1540, a value obtained by subtracting variable Sft (the amount of shift) from variable Ss (the provisional stable position) is substituted for variable Sn (the current step position of the stepping motor), and the process returns to the main routine.

Figure 29:
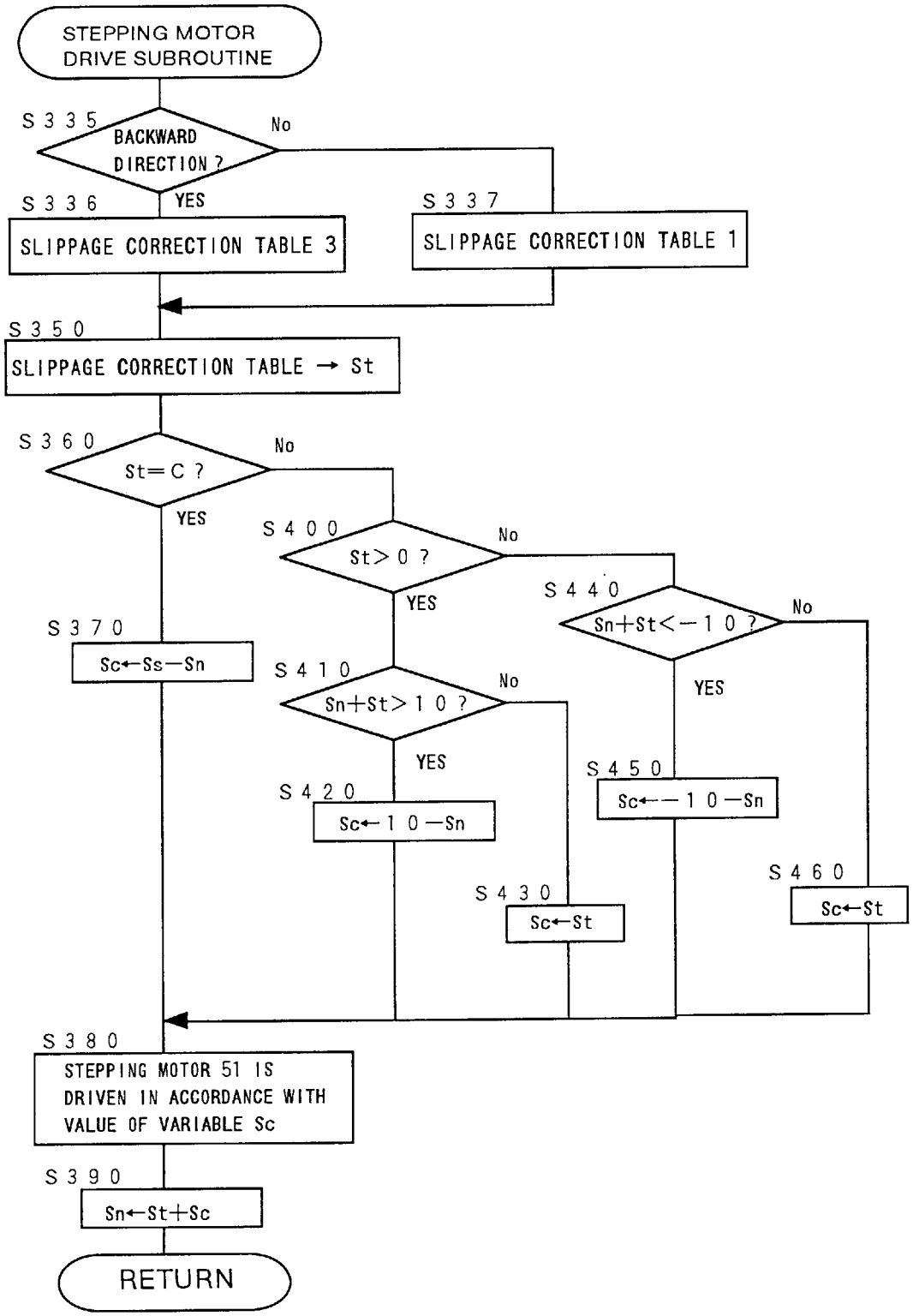
FIG. 29 is a flow chart showing the sequence of the stepping motor drive subroutine.

FIG. 29 shows the stepping motor drive subroutine of step S690 in the belt slippage correcting operation flow chart shown in FIG. 27.

The sequence of this subroutine is partially different from the sequence of the stepping motor drive subroutine shown in FIG. 12 and is used instead of the latter sequence Therefore, only differences from the stepping motor drive subroutine of FIG. 12 will be explained here, and the same numbers will be used for common steps.

When the stepping motor drive subroutine of step S690 is called in the belt slippage correcting operation flow chart shown in FIG. 27, it is determined in step S335 whether the direction of conveyance of intermediate transfer belt 20 is forward or backward.

Figure 30:
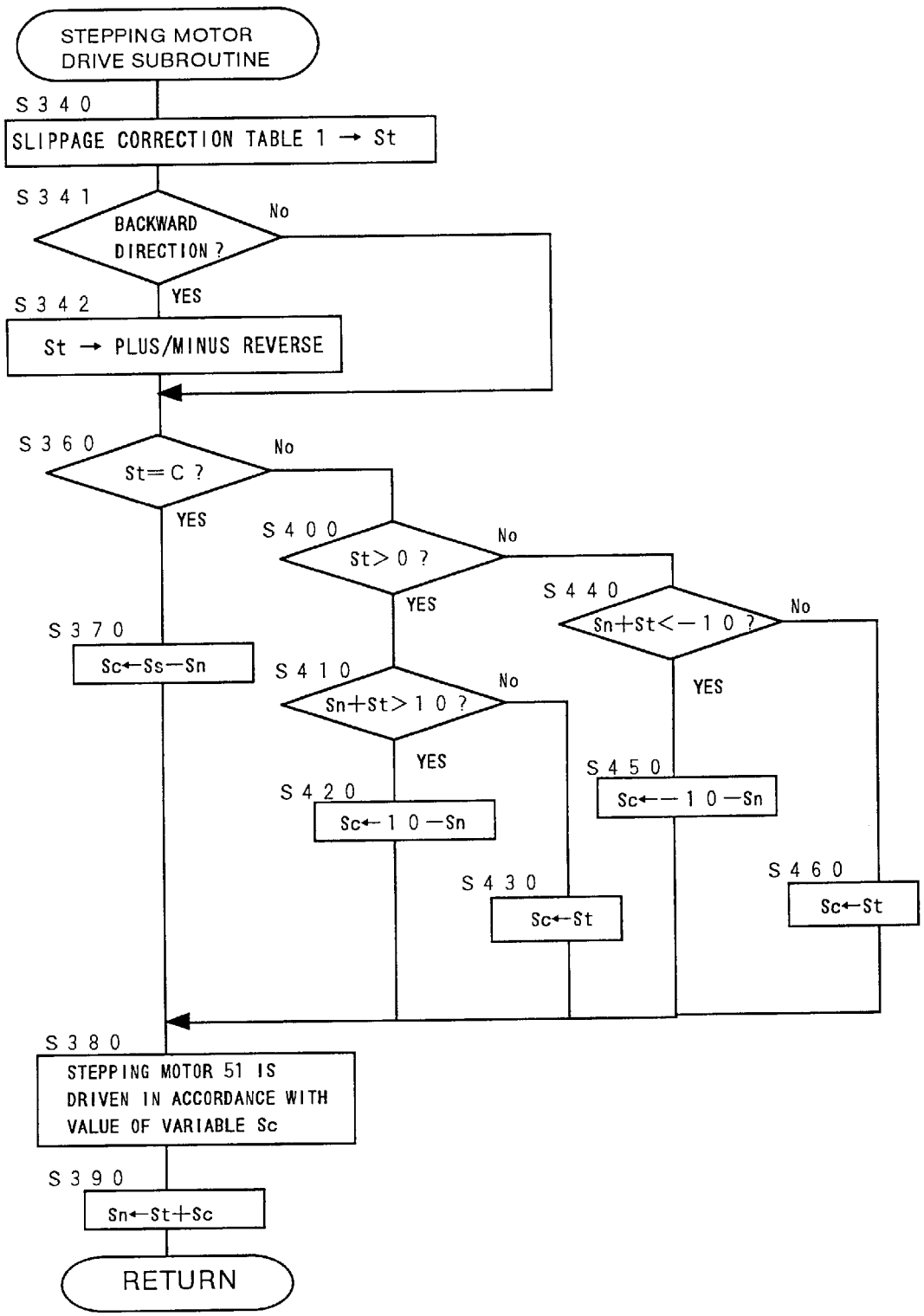
FIG. 30 is a flow chart showing the sequence of the stepping motor drive subroutine.

If it is forward, the process advances to step S337 in which the slippage correction table 1 shown in Table 2 is selected, and the process advances to step S350. Since step S350 and steps thereafter are identical to those shown in FIG. 12, their explanations will be omitted.

Where it is determined in step S330 that the direction of conveyance is backward, the process advances to step S336 in which the slippage correction table 3 shown in Table 4 is selected. The process then advances to step S350.

Where control is carried out during backward conveyance using the same number of steps as during forward conveyance but in the direction opposite to that during forward conveyance, one slippage correction table will suffice for both directions of conveyance, using the sequence of the stepping motor drive subroutine as shown in FIG. 30.

The sequence of this flow chart is partially different from that of the stepping motor drive subroutine shown in FIG. 12 and is used instead of the latter sequence, in the same way as the sequence of the flow chart of FIG. 29. Therefore, only differences from the sequence of the stepping motor drive subroutine shown in FIG. 12 will be explained here, and the same numbers will be used for common steps.

When the stepping motor drive subroutine of step S690 is called in the sequence of the belt slippage correcting operation flow chart shown in FIG. 27, the set value of the slippage correction table 1 is read as variable St (the value read from the slippage correction table) in step S340.

It is then determined in step S341 whether the direction of conveyance of intermediate transfer belt 20 is forward or backward.

In the case of forward conveyance, the process advances to step S360. Since step S360 and steps thereafter are identical to those shown in FIG. 12, their explanations will be omitted.

Where it is determined in step S341 that the direction of conveyance is backward, the process advances to step S342 in which the plus/minus symbol of the value of variable St is reversed, and the process advances to step S360. By carrying out this control, one slippage correction table can accommodate both directions of conveyance.

A method to perform slippage correction for the forward and backward conveyance of intermediate transfer belt 20, which is different from the methods explained above in which different control methods are used for forward conveyance and backward conveyance, will be now explained.

Figure 31:
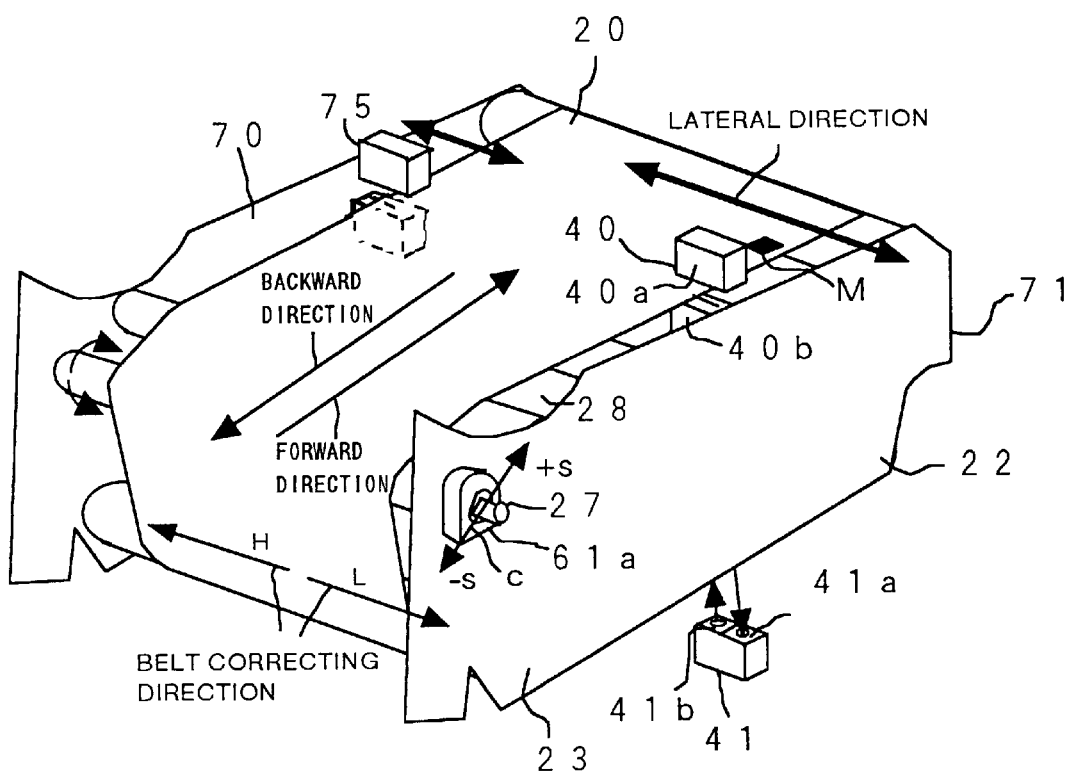
FIG. 31 is a perspective view showing a modified version of the intermediate transfer unit.

FIG. 31 is a perspective view of a modified version of the intermediate transfer unit shown in FIG. 26. Therefore, an explanation will be given focusing on differences from FIG. 26, and explanations as to common parts will be omitted.

The intermediate transfer unit shown in FIG. 31 has third position detection sensor 75 located at a position point-symmetrical with first position detection sensor 40 relative to the center line of intermediate transfer belt 20. When intermediate transfer belt 20 moves forward, first position detection sensor 40 is used, and when said belt moves backward, third position detection sensor 75 is used. When intermediate transfer belt 20 moves backward, third position detection sensor 75 outputs a belt detection value having a plus/minus symbol opposite from that of the value output by first position detection sensor 40 used during forward conveyance. If slippage correction is carried out using the value output from third position detection sensor 75 and in accordance with the flow charts of FIGS. 11 through 13 and FIGS. 15 through 18, the shift angle for first transfer pre-roller 27 is set in the direction opposite to the shift angle used during forward conveyance. Therefore, the same slippage correction as during forward conveyance is carried out during backward conveyance of intermediate transfer belt 20 as well.

Further, a control method to accommodate the belt slippage correcting operation during backward conveyance only by using a different circuit construction will be explained, said method itself being the same as that used during forward conveyance.

Figure 32:
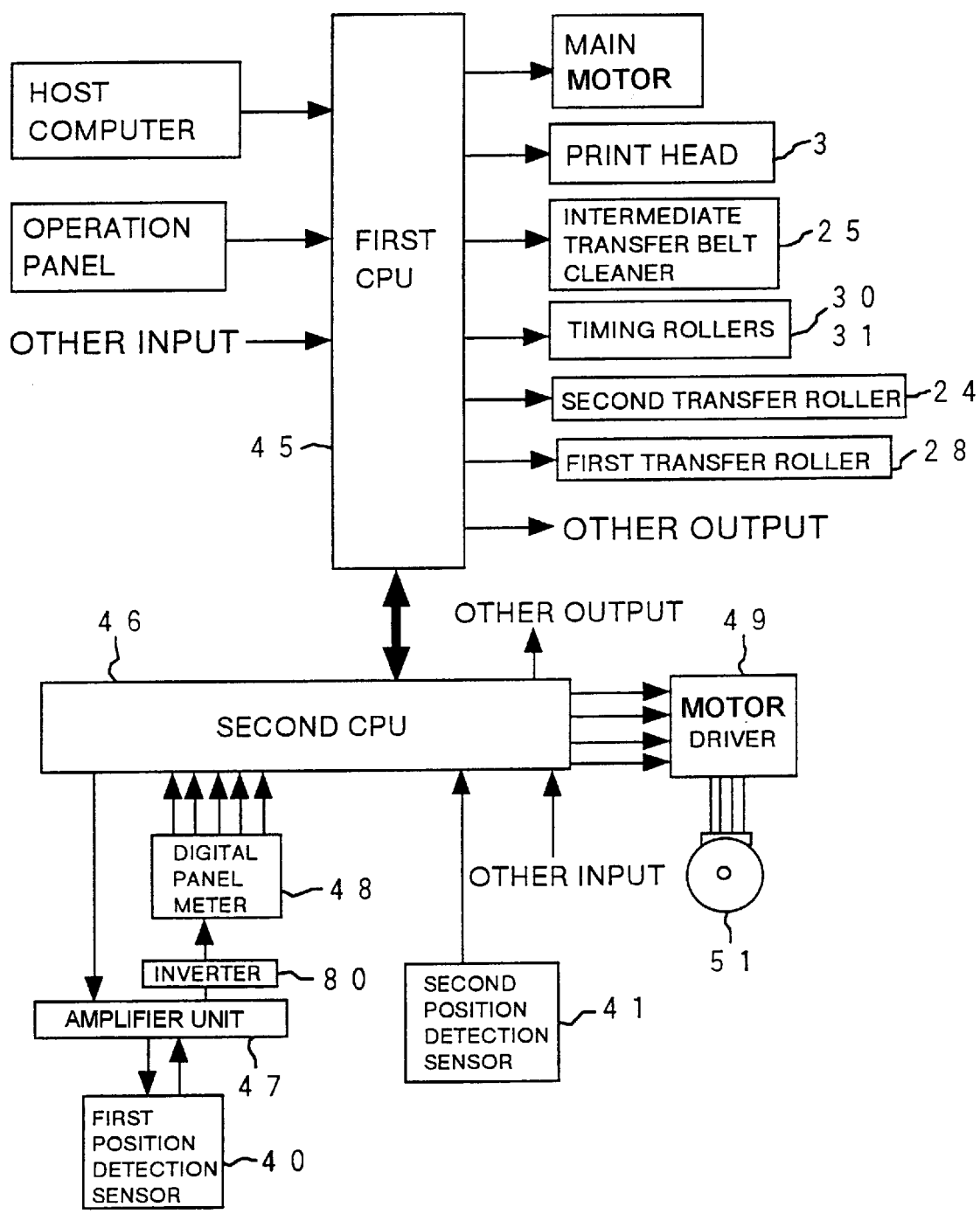
FIG. 32 shows a modified version of a control circuit block diagram of the image forming device.

FIG. 32 is a modified version of the control circuit block diagram shown in FIG. 7. Therefore, an explanation will be given focusing on differences from FIG. 7, and explanations regarding common parts will be omitted.

The control circuit block diagram of FIG. 32 is the same as the circuit block diagram of FIG. 7 except that inverter 80 is added. The signal output from first position detection sensor 40 via amplifier unit 47 is directly input to the digital panel meter during forward conveyance, but during backward conveyance, it is input to the digital panel meter via inverter 80. Since inverter 80 outputs the detection value of first position detection sensor 40 with the opposite absolute value, when intermediate transfer belt 20 rotates backward, the belt detection value has the opposite absolute value of that for forward conveyance. When slippage correction is performed based on this detection value and in accordance with the sequences shown in the flow charts of FIGS. 11 through 13 and FIGS. 15 through 18, the shift angle of first transfer pre-roller 27 is set in the direction opposite to that during forward conveyance. Therefore, the same slippage correction performed during forward conveyance of intermediate transfer belt 20 is carried out during backward conveyance as well.

By making the shift angle of the roller used for the purpose of slippage correction different for backward conveyance from that for forward conveyance as described above, slippage correction can be performed regardless of whether the belt is being conveyed forward or backward.

While the slippage correction device of the present invention was used in connection with an intermediate transfer belt in this embodiment, the application is not limited to this, and the present invention may be used regarding a belt-like photosensitive member and fusing belt as well.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A belt slippage correcting device for correcting slippage of a belt which is transported in a predetermined direction comprising:

a moving device for moving said belt in a direction perpendicular to the belt transporting direction;

a course changing device for changing a transporting course of the belt; and a control device for controlling the moving device so as to correct slippage of the belt by moving the belt in the direction perpendicular to the belt transporting direction according to the belt transporting course changed by said course changing device.

2. A belt slippage correcting device as claimed in claim 1, wherein said control device has a plurality of control patterns of the moving device and selects the preferable control pattern according to the belt transporting course changed by said course changing device.

3. A belt slippage correcting device for correcting slippage of a belt comprising:

a belt transporting device for transporting the belt in forward and backward directions;

a moving device for moving said belt in a direction perpendicular to the belt transporting directions;

a slippage detecting device for detecting slippage of the belt in the direction perpendicular to the belt transporting direction; and a control device for controlling the moving device so as to correct slippage of the belt according to the belt transporting direction.

4. A belt slippage correcting device as claimed in claim 3, wherein said control device has a plurality of control patterns of the moving device and selects the preferable control pattern according to forward or backward direction of the belt.

5. A belt slippage correcting device for correcting slippage of a belt which is transported in a predetermined direction comprising:

a moving device for moving said belt in a direction perpendicular to the belt transporting direction;

a slippage detecting device for detecting slippage of the belt in the direction perpendicular to the belt transporting direction; and a control device for controlling the moving device based on the detected slippage of the belt by the belt slippage detecting device such that the detected slippage of the belt is corrected while the moving velocity of the belt in the direction perpendicular to the belt transporting direction is maintained within a predetermined scope of velocity;

wherein said control device controls the moving device according to at least one slippage correcting table and the preferable slippage correcting table is selected from a plurality of slippage correcting tables according to an operating state of the belt;

wherein said control device controls the moving device such that the moving velocity of the belt in the direction perpendicular to the belt transporting direction upon starting of operation of the belt is faster than the moving velocity of the belt in the direction perpendicular to the belt transporting direction upon other state.

6. A belt slippage correcting device for correcting slippage of a belt which is transported in a predetermined direction comprising:

a moving device for moving said belt in a direction perpendicular to the belt transporting direction;

a slippage detecting device for detecting slippage of the belt in the direction perpendicular to the belt transporting direction: and a control device for controlling the moving device based on the detected slippage of the belt by the belt slippage detecting device such that the detected slippage of the belt is corrected while the moving velocity of the belt in the direction perpendicular to the belt transporting direction is maintained within a predetermined scope of velocity;

wherein said control device controls the moving device such that a predetermined position on the belt approaches a target in the direction perpendicular to the belt transporting direction at a speed within the predetermined scope of velocity; and wherein a transporting course of said belt is changeable, and said control device changes the target according to change of said transporting course of the belt.

7. A belt slippage correcting device for correcting slippage of a belt which is transported in a predetermined direction comprising:

a moving device for moving said belt in a direction perpendicular to the belt transporting direction;

a slippage detecting device for detecting slippage of the belt in the direction perpendicular to the belt transporting direction; and a control device for controlling the moving device based on the detected slippage of the belt by the belt slippage detecting device such that the detected slippage of the belt is corrected while the moving velocity of the belt in the direction perpendicular to the belt transporting direction is maintained within a predetermined scope of velocity;

wherein the belt is transported in forward and backward directions, and said control device has a plurality of control patterns of the moving device and selects the preferable control pattern according to the transporting direction of the belt.

8. A belt slippage correcting device for correcting slippage of a belt which is transported in a predetermined direction comprising:

a moving device for moving said belt in a direction perpendicular to the belt transporting direction;

a slippage detecting device for detecting slippage of the belt in the direction perpendicular to the belt transporting direction; and a control device for controlling the moving device based on the detected slippage of the belt by the belt slippage detecting device such that the detected slippage of the belt is corrected while the moving velocity of the belt in the direction perpendicular to the belt transporting direction is maintained within a predetermined scope of velocity;

wherein said control device controls the moving device according to at least one slippage correcting table and the preferable slippage correcting table is selected from a plurality of slippage correcting tables according to an operating state of the belt;

wherein the belt is transported in forward and backward directions, and said control device selects the preferable slippage correcting table from the plurality of the slippage correcting tables according to the transporting direction of the belt.

* * * * *